United States Patent
Peng et al.

(10) Patent No.: US 12,243,137 B2
(45) Date of Patent: Mar. 4, 2025

(54) DISTRIBUTED COMPUTING SYSTEM AND METHOD FOR GENERATING A VECTOR TILE OF A SELECTED SQUARED MAP AREA

(71) Applicant: GRABTAXI HOLDINGS PTE. LTD., Singapore (SG)

(72) Inventors: Yuxiang Peng, Beijing (CN); Haonan Dong, Beijing (CN); Bo Hu, Beijing (CN)

(73) Assignee: GRABTAXI HOLDINGS PTE. LTD., Singapore (SG)

( * ) Notice: Subject to any disclaimer, the term of this patent is extended or adjusted under 35 U.S.C. 154(b) by 0 days.

(21) Appl. No.: 18/256,673

(22) PCT Filed: Jan. 23, 2022

(86) PCT No.: PCT/SG2022/050030
§ 371 (c)(1),
(2) Date: Jun. 9, 2023

(87) PCT Pub. No.: WO2022/211723
PCT Pub. Date: Oct. 6, 2022

(65) Prior Publication Data
US 2024/0037823 A1 Feb. 1, 2024

(30) Foreign Application Priority Data
Apr. 1, 2021 (SG) .......................... 10202103347V

(51) Int. Cl.
*G06T 11/60* (2006.01)
*G01C 21/00* (2006.01)
(Continued)

(52) U.S. Cl.
CPC .............. *G06T 11/60* (2013.01); *G06F 16/29* (2019.01); *G06T 3/40* (2013.01); *G06T 11/203* (2013.01);
(Continued)

(58) Field of Classification Search
CPC ......... G06T 11/60; G06T 3/40; G06T 11/203; G06T 2210/36; G06F 16/29; G01C 21/3863; G01C 21/3874
See application file for complete search history.

(56) References Cited

U.S. PATENT DOCUMENTS 6,985,929 B1    1/2006   Wilson et al.
7,660,441 B2    2/2010   Chen et al.
(Continued)

FOREIGN PATENT DOCUMENTS

CN        108090151 A     5/2018

OTHER PUBLICATIONS

Jia Yu et al., "A Scalable Geospatial Data Visualization Framework in the Apache Spark Ecosystem", Jul. 9-11, 2018, (Year: 2023).*
(Continued)

*Primary Examiner* — Rami Khatib
*Assistant Examiner* — Gabriel Joseph Rene Lambert
(74) *Attorney, Agent, or Firm* — Buckley, Maschoff & Talwalkar LLC

(57) ABSTRACT

Aspects concern a distributed computing system for generating vector tiles of a selected map area including a memory unit configured to store map data and a task database, the map data including a representation of the selected map area with a first resolution and a first detail level and with a second resolution higher than the first resolution and a second detail level; two or more processing units, each of the two or more processing units configured to select a task included in the task database, to execute the selected task,
(Continued)

and to provide data generated by the selected task to the memory unit for storage; wherein one of the two or more processing units is further configured to schedule the generation of vector tiles by determining tasks using a specific predefined directed acyclic task graph and to provide the determined task to the task database.

13 Claims, 13 Drawing Sheets

(51) Int. Cl.
    *G06F 16/29*     (2019.01)
    *G06T 3/40*     (2024.01)
    *G06T 11/20*     (2006.01)

(52) U.S. Cl.
    CPC ..... *G01C 21/3863* (2020.08); *G01C 21/3874* (2020.08); *G06T 2210/36* (2013.01)

(56) References Cited

U.S. PATENT DOCUMENTS

| | | | |
|---|---|---|---|
| 8,130,245 B2 | 3/2012 | Ham et al. | |
| 8,650,220 B2 | 2/2014 | Rohlf et al. | |
| 9,111,397 B2* | 8/2015 | Kalai | G01C 21/3889 |
| 9,201,898 B2 | 12/2015 | Chawathe et al. | |
| 9,684,673 B2 | 6/2017 | Beckett et al. | |
| 2014/0306991 A1* | 10/2014 | Kalai | G06T 11/60 |
| | | | 345/630 |
| 2016/0098598 A1* | 4/2016 | Pahwa | G06T 7/60 |
| | | | 382/113 |
| 2017/0076442 A1* | 3/2017 | Schoenmeyer | G06T 7/11 |
| 2017/0364450 A1 | 12/2017 | Struttmann | |
| 2019/0213007 A1 | 7/2019 | Zhang et al. | |
| 2019/0370271 A1* | 12/2019 | Christensen | G06F 16/29 |

OTHER PUBLICATIONS

Gong et. al.: "On the Development of Geospatial Information Service Technology", Wuhan University, Wuhan, Review of the development of Geospatial information service technology[J]. Bulletin of Surveying and Mapping, vol. 5, 2008, pp. 5-10. (12 pages). Automated English translation provided.

Brunner et. al: "Distributed Geospatial Data Processing Functionality to Support Collaborative and Rapid Emergency Response", IEEE Journal of Selected Topics in Applied Earth Observations and Remote Sensing, vol. 2, No. 1, Mar. 2009. 14 pages.

Guan-Fu et. al.: WebGIS-Internet based geographic information system[J], Journal of Image and Graphics, vol. 3, 1998, pp. 251-254. (8 pages). Automated English translation provided.

Maso et. al.: "OpenGIS Web Map Tile Service Implementation StandardII", Open Geospatial Consortium, 2010. (129 pages)—Part 1.

Maso et. al.: "OpenGIS Web Map Tile Service Implementation StandardII", Open Geospatial Consortium, 2010. (129 pages)—Part 2.

Pegfei et. al.: "Research On Key Technology Of Quick Copy And Random Accessing Of Massive Map Tiles", IGARSS 2019—2019 IEEE International Geoscience and Remote Sensing Symposium, Yokohama, Japan, 2019, pp. 3491-3494, doi: 10.1109/IGARSS. 2019.8898982. (4 pages).

International Search Report and Written Opinion dated Apr. 20, 2022 which was issued in connection with PCT/SG2022/050030.

Yu J. et al., GeoSparkViz: a scalable geospatial data visualization framework in the apache spark ecosystem. SSDBM '18: Proceedings of the 30th International Conference on Scientific and Statistical Database Management, Jul. 31, 2018, pp. 1-12 [Retrieved on Apr. 28, 2022] <DOI: https://doi.org/10.1145/3221269. 3223040>Figs. 4-5, Sections 1-8.

International Preliminary Report of Palatability dated Nov. 7, 2022 which was issued in connection with PCT/SG2022/050030.

Angéla Olasz, Nguyen Thai Binh, Daniel Kristof, A New Initiative for Tiling, Stitching and Processing Geospatial Big Data in Distributed Computing Environments, Jun. 2016.

P. Soille, A. Burger, D. De Marchi, P. Kempeneers, D. Rodriguez, V. Syrris, V. Vasilev, A versatile data-intensive computing platform for information retrieval from big geospatial data, Nov. 5, 2017.

Zhou Yuke, Zhou Chenghu, Mattin, Gao Xizhang, Fan Junfu, Xu Tao, Ji Min, Research on Parallel Point and Area Overlay Analysis Method Based on Data Divide and Conquer and Double Index, May 19, 2015.

Our map data (Webpage).

* cited by examiner

FIG. 7

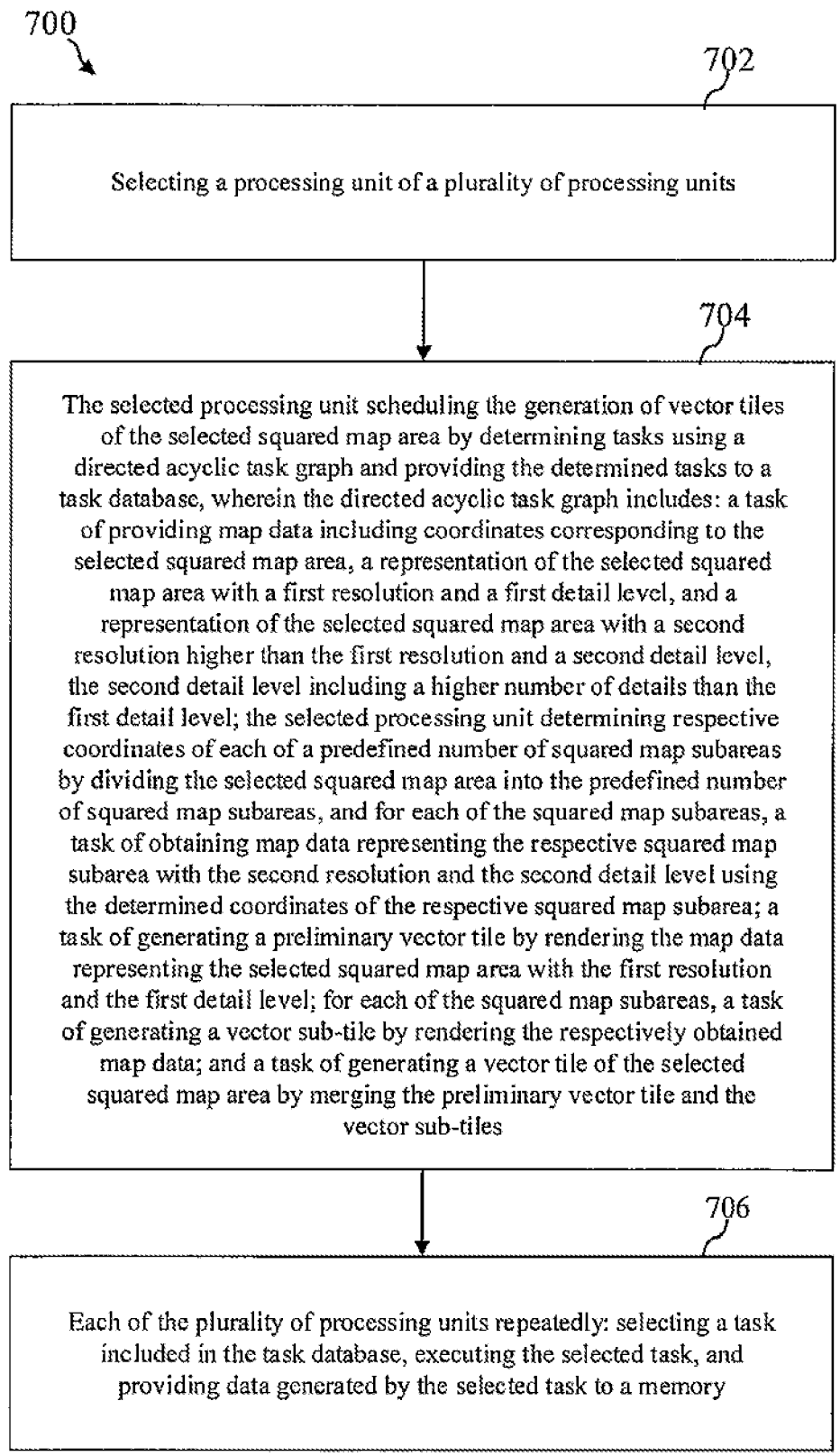

700

702
Selecting a processing unit of a plurality of processing units

704
The selected processing unit scheduling the generation of vector tiles of the selected squared map area by determining tasks using a directed acyclic task graph and providing the determined tasks to a task database, wherein the directed acyclic task graph includes: a task of providing map data including coordinates corresponding to the selected squared map area, a representation of the selected squared map area with a first resolution and a first detail level, and a representation of the selected squared map area with a second resolution higher than the first resolution and a second detail level, the second detail level including a higher number of details than the first detail level; the selected processing unit determining respective coordinates of each of a predefined number of squared map subareas by dividing the selected squared map area into the predefined number of squared map subareas, and for each of the squared map subareas, a task of obtaining map data representing the respective squared map subarea with the second resolution and the second detail level using the determined coordinates of the respective squared map subarea; a task of generating a preliminary vector tile by rendering the map data representing the selected squared map area with the first resolution and the first detail level; for each of the squared map subareas, a task of generating a vector sub-tile by rendering the respectively obtained map data; and a task of generating a vector tile of the selected squared map area by merging the preliminary vector tile and the vector sub-tiles 706
Each of the plurality of processing units repeatedly: selecting a task included in the task database, executing the selected task, and providing data generated by the selected task to a memory ＃ DISTRIBUTED COMPUTING SYSTEM AND METHOD FOR GENERATING A VECTOR TILE OF A SELECTED SQUARED MAP AREA The present invention is a 371 of International Application No. PCT/SG2022/050030, filed on Jan. 23, 2022, and claiming priority to Singapore Application No. 10202103347V filed on Apr. 1, 2021, incorporated by reference herein in its entirety.

TECHNICAL FIELD

Various aspects of this disclosure relate to a distributed computing system and a method for generating a vector tile of a selected squared map area.

BACKGROUND

Various computer applications may use geospatial map data provided to a user device via streaming from a server. To reduce a data size for streaming the map data and/or for storing the map data locally on the user device, vector tiles or raster tiles of the map data may be pre-generated and upon request streamed to the user device. However, especially for large map areas, such as a world map, a map of a continent, a map of Southeast Asia, etc., the generation of a vector tile requires a high computational cost as well as a high expenditure of time (e.g., several weeks of computation in the case of the world map). Due to such long computation times, the map data may already be out of date as soon as the vector tile is generated. Accordingly, it is desirable to reduce the time for generating vector tiles.

SUMMARY

Various embodiments relate to a distributed computing system for generating vector tiles of a selected squared map area, the distributed computing system may include: a memory unit configured to store map data, a task database, and generated vector tiles, wherein the map data may include coordinates corresponding to the selected squared map area, a representation of the selected squared map area with a first resolution and a first detail level, and a representation of the selected squared map area with a second resolution higher than the first resolution and a second detail level, the second detail level may include a higher number of details than the first detail level; two or more processing units, each of the two or more processing units configured to select a task included in the task database, to execute the selected task, and to provide data generated by the selected task to the memory unit for storage; wherein one of the two or more processing units is further configured to schedule the generation of vector tiles of the selected squared map area by determining tasks using a directed acyclic task graph, and to provide the determined task to the task database. The directed acyclic task graph may include: the one of the two or more processing units determining respective coordinates of each of a predefined number of squared map subareas by dividing the selected squared map area into the predefined number of squared map subareas, and for each of the squared map subareas, a task of obtaining map data representing the respective squared map subarea with the second resolution and the second detail level using the determined coordinates of the respective squared map subarea; a task of generating a preliminary vector tile by rendering the map data representing the selected squared map area with the first resolution and the first detail level; for each of the squared map subareas, a task of generating a vector sub-tile by rendering the respectively obtained map data; and a task of generating a vector tile of the selected squared map area by merging the preliminary vector tile and the vector sub-tiles.

According to various embodiments, the memory unit may be further configured to store other map data, wherein the other map data may include respective coordinates corresponding to each of one or more other squared map areas, a representation of each of the one or more other squared map areas associated with the first resolution of the selected squared map area, and a representation of each of the one or more other squared map areas associated with the second resolution of the selected squared map area, wherein each of the one or more other squared map areas may include respective features different from features shown in the selected squared map area; and wherein the directed acyclic task graph may further include: for each of the one or more other squared map areas associated with the first resolution, a task of generating cut map data by cutting the respective other squared map area such that the cut map area covers the same area as the selected squared map area; for each of the one or more cut map areas, the one of the two or more processing units determining respective coordinates of each of a predefined number other squared map subareas by dividing the respective cut map area into the predefined number of other squared map subareas, and for each of the other squared map subareas, a task of obtaining map data representing the respective other squared map subarea associated with the second resolution using the determined coordinates of the respective other squared map subarea, wherein each of the other squared map subareas is associated with a squared map subarea corresponding to the selected squared map area; for each of the one or more cut map areas, a task of generating another preliminary vector tile by rendering the cut map data representing the respective other squared map area; a task of generating a combined preliminary vector tile by merging the preliminary vector tile and the other preliminary vector tiles; for each of the one or more cut map areas, for each of the other squared map subareas, a task of generating another vector sub-tile by rendering the respectively obtained map data; for each squared map subarea corresponding to the selected squared map area, a task of generating a combined vector sub-tile by merging the respective vector sub-tile and the associated other vector sub-tiles; and wherein the task of generating the vector tile of the selected squared map area by merging the preliminary vector tile and the vector sub-tiles includes generating the vector tile of the selected squared map by merging the combined preliminary vector tile and the combined vector sub-tiles.

According to various embodiments, the features shown in the selected squared map area may represent topographic features and the topographic features may include one or more of a group consisting of: continents, hills, valleys, gullies, ridges, oceans, rivers, swamps, coastal, national parks, farmland, plantations, buildings, roads, property boundaries, political boundaries. The features shown in at least one other squared map area of the one or more other squared map areas may represent a traffic volume and/or information on points of interest.

According to various embodiments, the memory unit may be further configured to store a log database; each of the two or more processing units may be further configured to provide log data associated with the execution of the selected task to the log database, the log data indicating whether a task was finished or not; and the one of the two or more processing units may be configured to determine the tasks using the log data stored in the log database: wherein, if the log database includes a task indicated as finished, the one of the two or more processing units is configured to determine one or more tasks directly dependent on the finished task using the directed acyclic task graph, to determine for each of the one or more tasks, if each task the respective task depends on is finished and, if each task the respective task depends on is finished, to provide the respective task to the task database.

According to various embodiments, the distributed computing system may further include a monitoring unit configured to perform a heartbeat monitoring of each of the two or more processing units; and a control unit configured to: select a scheduling processing unit from the two or more processing units, wherein each of the two or more processing units may be configured to schedule the generation of vector tiles of the selected squared map area, wherein only the selected scheduling processing unit may be permitted to schedule the generation of vector tiles, and wherein the one of the two processing units may be the currently selected scheduling processing unit; receive information regarding the heartbeat monitoring from the monitoring unit; and if the heartbeat monitoring indicates a connectivity loss of the current scheduling processing unit, select another processing unit of the two or more processing units as the scheduling processing unit to permit the other processing unit to schedule the generation of vector tiles of the selected squared map area.

According to various embodiments, the distributed computing system may further include a plurality of server computers constituting a content delivery network configured to provide the generated vector tile.

According to various embodiments, the content delivery network may be configured to provide the generated vector tile via a Web Map Tile Service.

According to various embodiments, each predefined number may be equal to four.

According to various embodiments, the map data may represent the selected squared map area at a non-zoomed level and at a plurality of zoom levels, wherein the plurality of zoom levels may include consecutively numbered zoom levels from a first zoom level to an n-th zoom level with n≥6, wherein each zoom level is associated with a higher resolution and a higher number of details than the prior zoom level; and the directed acyclic task graph may include: dividing the selected squared map area at the non-zoomed level into a predefined number of squared map subareas associated with the first zoom level and for each of the squared map subareas associated with the first zoom level, a task of obtaining map data representing the respective squared map subarea at the first zoom level; for each of the squared map subareas at the first zoom level, a task of dividing the respective squared map subarea into a predefined number of squared map subareas associated with the second zoom level and for each of the squared map subareas associated with the second zoom level, a task of obtaining map data representing the respective squared map subarea at the second zoom level; for each of the squared map subareas at the second zoom level, a task of dividing the respective squared map subarea into a predefined number of squared map subareas associated with the third zoom level and for each of the squared map subareas associated with the third zoom level, a task of obtaining map data representing the respective squared map subarea at the third zoom level; a task of rendering the map data from the non-zoomed level to the third zoom level to generate a vector tile associated with the non-zoomed to third zoom levels; for each of the squared map subareas at the third zoom level, a task of dividing the respective squared map subarea into a predefined number of squared map subareas associated with the fourth zoom level and for each of the squared map subareas associated with the fourth zoom level, a task of obtaining map data representing the respective squared map subarea at the fourth zoom level; for each of the squared map subareas at the fourth zoom level, a task of rendering the respectively obtained map data to generate a respective vector tile associated with the fourth zoom level; for each of the squared map subareas at the fourth zoom level, a task of dividing the respective squared map subarea into a predefined number of squared map subareas associated with the fifth zoom level and for each of the squared map subareas associated with the fifth zoom level, a task of obtaining map data representing the respective squared map subarea at the fifth zoom level; for each of the squared map subareas at the fifth zoom level, determining, if a data size of the respective map data associated with the fifth zoom level is greater than a threshold value: if the data size of the map data is not greater than the threshold value, a task of rendering the obtained map data from the fifth zoom level to the n-th zoom level to a respective vector tile associated with the fifth to n-th zoom levels; and if the data size of the map data is greater than the threshold value, a task of rendering the respectively obtained map data to generate a respective vector tile associated with the fifth zoom level, a task of dividing the respective squared map subarea at the fifth zoom level into a predefined number of squared map subareas associated with the sixth zoom level and for each of the squared map subareas associated with the sixth zoom level, a task of obtaining map data representing the respective squared map subarea at the sixth zoom level, a task of rendering the obtained map data from the sixth zoom level to the n-th zoom level to a respective vector tile associated with the sixth to n-th zoom levels, and a task of merging the vector tile associated with the fifth zoom level and the vector tiles associated with the sixth to n-th zoom levels to generate a respective vector tile associated with the fifth to n-th zoom levels; for each of the squared map subareas at the fourth zoom level, a task of merging the respectively generated vector tile and the vector tiles associated with the fifth to n-th zoom levels corresponding to the squared map subareas at the fifth zoom level which are part of the respective squared map subarea at the fourth zoom level to generate a respective vector tile associated with the fourth to n-th zoom levels; for each of the squared map subareas at the third zoom level, a task of merging the vector tiles associated with the fourth to n-th zoom levels corresponding to the squared map subareas at the fourth zoom level which are part of the respective squared map subarea at the third zoom level to generate a respective vector tile associated with the third to n-th zoom levels; for each of the squared map subareas at the second zoom level, a task of merging the vector tiles associated with the third to n-th zoom levels corresponding to the squared map subareas at the third zoom level which are part of the respective squared map subarea at the second zoom level to generate a respective vector tile associated with the second to n-th zoom levels; for each of the squared map subareas at the first zoom level, a task of merging the vector tiles associated with the second to n-th zoom levels corresponding to the squared map subareas at the second zoom level which are part of the respective squared map subarea at the first zoom level to generate a respective vector tile associated with the first to n-th zoom levels; a task of merging the vector tile associated with the non-zoomed to third zoom levels and all vector tiles associated with the first to n-th zoom levels to generate a vector tile of the selected squared map area associated with the non-zoomed to n-th zoom levels.

Various embodiments relate to a distributed computing system for generating vector tiles of a selected squared map area, the distributed computing system may include: a memory unit configured to store map data, a task database, and generated vector tiles, wherein the map data may represent the selected squared map area at a non-zoomed level and at a plurality of zoom levels, the plurality of zoom levels may include consecutively numbered zoom levels from a first zoom level to an n-th zoom level with n≥6, wherein each zoom level may be associated with a higher resolution and a higher number of details than the prior zoom level; two or more processing units, each of the two or more processing units configured to select a task included in the task database, to execute the selected task, and to provide data generated by the selected task to the memory unit for storage; wherein one of the two or more processing units may be configured to schedule the generation of vector tiles of the selected squared map area by determining tasks using a directed acyclic task graph, and to provide the determined task to the task database. The directed acyclic task graph may include: dividing the selected squared map area at the non-zoomed level into a predefined number of squared map subareas associated with the first zoom level and for each of the squared map subareas associated with the first zoom level, a task of obtaining map data representing the respective squared map subarea at the first zoom level; for each of the squared map subareas at the first zoom level, a task of dividing the respective squared map subarea into a predefined number of squared map subareas associated with the second zoom level and for each of the squared map subareas associated with the second zoom level, a task of obtaining map data representing the respective squared map subarea at the second zoom level; for each of the squared map subareas at the second zoom level, a task of dividing the respective squared map subarea into a predefined number of squared map subareas associated with the third zoom level and for each of the squared map subareas associated with the third zoom level, a task of obtaining map data representing the respective squared map subarea at the third zoom level; a task of rendering the map data from the non-zoomed level to the third zoom level to generate a vector tile associated with the non-zoomed to third zoom levels; for each of the squared map subareas at the third zoom level, a task of dividing the respective squared map subarea into a predefined number of squared map subareas associated with the fourth zoom level and for each of the squared map subareas associated with the fourth zoom level, a task of obtaining map data representing the respective squared map subarea at the fourth zoom level; for each of the squared map subareas at the fourth zoom level, a task of rendering the respectively obtained map data to generate a respective vector tile associated with the fourth zoom level; for each of the squared map subareas at the fourth zoom level, a task of dividing the respective squared map subarea into a predefined number of squared map subareas associated with the fifth zoom level and for each of the squared map subareas associated with the fifth zoom level, a task of obtaining map data representing the respective squared map subarea at the fifth zoom level; for each of the squared map subareas at the fifth zoom level, determining, if a data size of the respective map data associated with the fifth zoom level is greater than a threshold value: if the data size of the map data is not greater than the threshold value, a task of rendering the obtained map data from the fifth zoom level to the n-th zoom level to a respective vector tile associated with the fifth to n-th zoom levels; and if the data size of the map data is greater than the threshold value, a task of rendering the respectively obtained map data to generate a respective vector tile associated with the fifth zoom level, a task of dividing the respective squared map subarea at the fifth zoom level into a predefined number of squared map subareas associated with the sixth zoom level and for each of the squared map subareas associated with the sixth zoom level, a task of obtaining map data representing the respective squared map subarea at the sixth zoom level, a task of rendering the obtained map data from the sixth zoom level to the n-th zoom level to a respective vector tile associated with the sixth to n-th zoom levels, and a task of merging the vector tile associated with the fifth zoom level and the vector tiles associated with the sixth to n-th zoom levels to generate a respective vector tile associated with the fifth to n-th zoom levels; for each of the squared map subareas at the fourth zoom level, a task of merging the respectively generated vector tile and the vector tiles associated with the fifth to n-th zoom levels corresponding to the squared map subareas at the fifth zoom level which are part of the respective squared map subarea at the fourth zoom level to generate a respective vector tile associated with the fourth to n-th zoom levels; for each of the squared map subareas at the third zoom level, a task of merging the vector tiles associated with the fourth to n-th zoom levels corresponding to the squared map subareas at the fourth zoom level which are part of the respective squared map subarea at the third zoom level to generate a respective vector tile associated with the third to n-th zoom levels; for each of the squared map subareas at the second zoom level, a task of merging the vector tiles associated with the third to n-th zoom levels corresponding to the squared map subareas at the third zoom level which are part of the respective squared map subarea at the second zoom level to generate a respective vector tile associated with the second to n-th zoom levels; for each of the squared map subareas at the first zoom level, a task of merging the vector tiles associated with the second to n-th zoom levels corresponding to the squared map subareas at the second zoom level which are part of the respective squared map subarea at the first zoom level to generate a respective vector tile associated with the first to n-th zoom levels; a task of merging the vector tile associated with the non-zoomed to third zoom levels and all vector tiles associated with the first to n-th zoom levels to generate a vector tile of the selected squared map area associated with the non-zoomed to n-th zoom levels.

According to various embodiments, the selected squared map area may be a world map and the generated vector tile of the selected squared map area may be a vector tile of the world map; or the selected squared map area may be a map of a continent and the generated vector tile of the selected squared map area may be a vector tile of the map of the continent; or the selected squared map area may be a map of Southeast Asia and the generated vector tile of the selected squared map area may be a vector tile of the map of Southeast Asia.

According to various embodiments, the distributed computing system may be configured to generate the vector tile of the selected squared map area in less than one week.

Various embodiments relate to a method for generating vector tiles of a selected squared map area using a distributed computing system may include: selecting a processing unit of a plurality of processing units; the selected processing unit scheduling the generation of vector tiles of the selected squared map area by determining tasks using a directed acyclic task graph and providing the determined task to a task database; each of the plurality of processing units repeatedly: selecting a task included in the task database, executing the selected task, and providing data generated by the selected task to a memory. The directed acyclic task graph may include: a task of providing map data including coordinates corresponding to the selected squared map area, a representation of the selected squared map area with a first resolution and a first detail level, and a representation of the selected squared map area with a second resolution higher than the first resolution and a second detail level, the second detail level including a higher number of details than the first detail level; the selected processing unit determining respective coordinates of each of a predefined number of squared map subareas by dividing the selected squared map area into the predefined number of squared map subareas, and for each of the squared map subareas, a task of obtaining map data representing the respective squared map subarea with the second resolution and the second detail level using the determined coordinates of the respective squared map subarea; a task of generating a preliminary vector tile by rendering the map data representing the selected squared map area with the first resolution and the first detail level; for each of the squared map subareas, a task of generating a vector sub-tile by rendering the respectively obtained map data; and a task of generating a vector tile of the selected squared map area by merging the preliminary vector tile and the vector sub-tiles.

According to various aspects, a computer program element may include program instructions, which, when executed by processing units in a distributed computing system, cause the processing units to perform the method of the above embodiment.

According to various aspects, a computer-readable medium may include program instructions, which, when executed by processing units in a distributed computing system, cause the processing units to perform the method of the above embodiment.

BRIEF DESCRIPTION OF THE DRAWINGS

The invention will be better understood with reference to the detailed description when considered in conjunction with the non-limiting examples and the accompanying drawings, in which:

FIG. 7 shows a flow diagram illustrating a method for generating a vector tile of a selected squared map area according to an embodiment.

DETAILED DESCRIPTION

Figure 1:
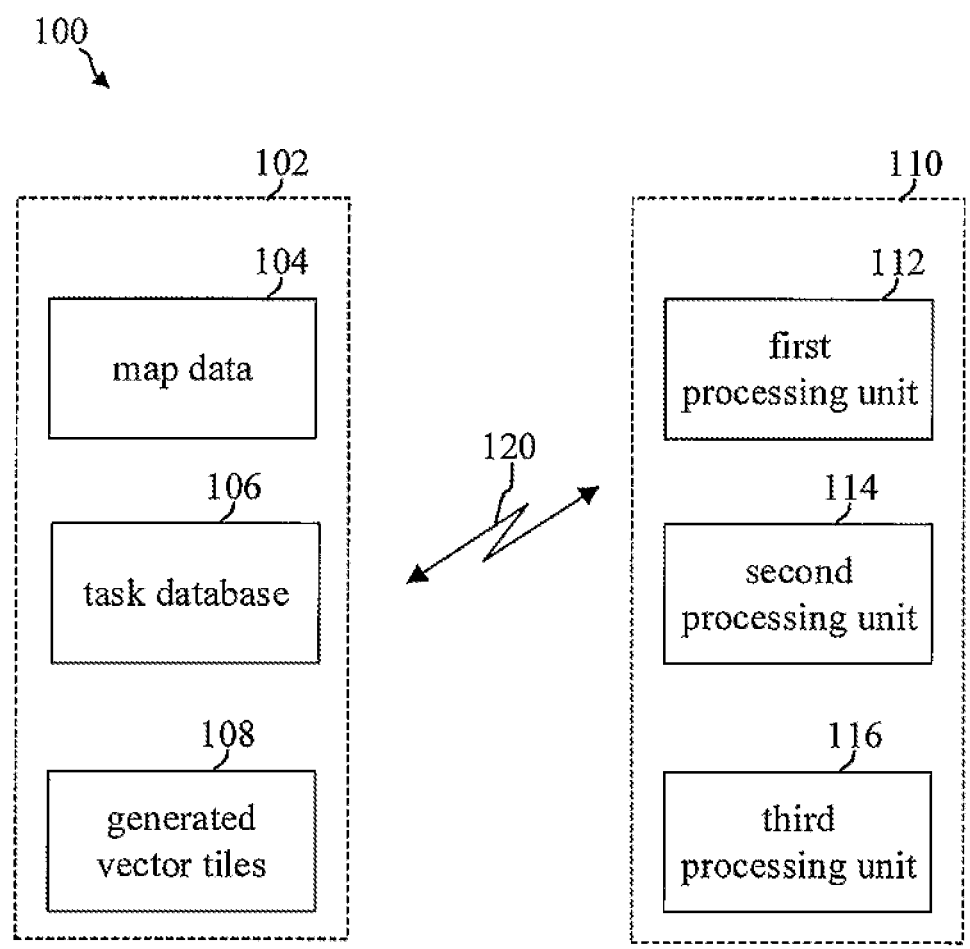
FIG. 1 shows a distributed computing system for generating a vector tile of a selected squared map area, according to various embodiments.

The following detailed description refers to the accompanying drawings that show, by way of illustration, specific details and embodiments in which the disclosure may be practiced. These embodiments are described in sufficient detail to enable those skilled in the art to practice the disclosure. Other embodiments may be utilized and structural, and logical changes may be made without departing from the scope of the disclosure. The various embodiments are not necessarily mutually exclusive, as some embodiments can be combined with one or more other embodiments to form new embodiments.

Embodiments described in the context of one of the computing systems, processing units, or methods are analogously valid for the other computing systems, processing units or methods. Similarly, embodiments described in the context of a method are analogously valid for a computing system and/or processing units, and vice-versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

In the context of various embodiments, the articles "a", "an" and "the" as used with regard to a feature or element include a reference to one or more of the features or elements.

As used herein, the term "and/or" includes any and all combinations of one or more of the associated listed items.

As used herein and in accordance with various embodiments, the expression "method for" may also include the meaning of "method of".

As used herein, the term "map data" may refer to a corresponding map area and may include various features within the map area. As used herein, "features" of a map area may include any kind of attribute characterizing the map area. For example, features of a map area may include land area (e.g., continents, e.g., islands), oceans, landforms (e.g., hills, valleys, gullies, ridges, etc.), water courses (e.g., rivers, swamps, coastal, etc.), vegetation (e.g., national parks, farmland, plantations, etc.), manmade objects/stipulations (e.g., buildings, roads, property boundaries, political boundaries, points of interest, etc.), and/or manmade dynamic objects (e.g., traffic participants, e.g., a volume of traffic). The map data may represent the map area two-dimensionally or three-dimensionally. In the case of a three-dimensionally map area, the map area may be a two-dimensionally map area including height information. The processing of a map area (or map subarea) as describe herein, may refer to the two-dimensional map area represented by, for example, longitude and latitude of the world map.

As used herein, the term "resolution" used with respect to a map area may be described in meter per pixel. For example, in the case that one map area is described as having a higher resolution than another map area, the map area may include less meter per pixel than the other map area.

As used herein, a vector tile may have any kind of vector tile format, such as MBTiles, MVT (Mapnik Vector Tiles), Mapbox vector tile format, OpenScienceMap OSciM-PBF, GSOC2012 Data Tile Service, Kothic JSON, GeoJSON, Mapsforge, etc.

In the following, embodiments will be described in detail.

The generation of a vector tile of a map area, particularly a large map area, requires a high computational cost and a high expenditure of time. Thus, data representing the map area may already be out of date as soon as the vector tile is generated. Various aspects relate to a distributed computing system and a method capable to generate a vector tile of a selected squared map area with a significantly reduced expenditure of time.

FIG. 1 shows a distributed computing system 100 according to various aspects. The distributed computing system 100 may include a memory unit 102. The distributed computing system 100 may include two or more processing units 110 (e.g., five or more processing units, e.g., ten or more processing units, etc.). In the following, the two or more processing units 110 may be described as including a first processing unit 112, a second processing unit 114, and a third processing unit 116. However, it is noted that the two or more processing units 110 may include any integer number of processing units greater than one (i.e., two or more). According to various aspects, the processing units 112, 114, 116 of the two or more processing units 110 may be located at different locations (e.g., multiple km apart from each other, e.g., in different countries, e.g., on different continents).

The two or more processing units 110 and the memory unit 102 may be configured to communicate with each other via a communication link 120. For example, the memory unit 102 may include a communication interface configured to communicate with each processing unit 112, 114, 116 of the two or more processing units 110.

According to various aspects, the memory unit 102 may be a memory external from the two or more processing units 110, such as a cloud (e.g., a cloud server).

A processing unit, as used herein, may include computer. In an embodiment, a "computer" may be understood as any kind of a logic implementing entity, which may be hardware, software, firmware, or any combination thereof. Thus, in an embodiment, a "computer" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "computer" may also be software being implemented or executed by a processor, e.g. any kind of computer program, e.g. a computer program using a virtual machine code such as e.g. Java. Any other kind of implementation of the respective functions which will be described in more detail below may also be understood as a "computer" in accordance with an alternative embodiment.

Figure 2:
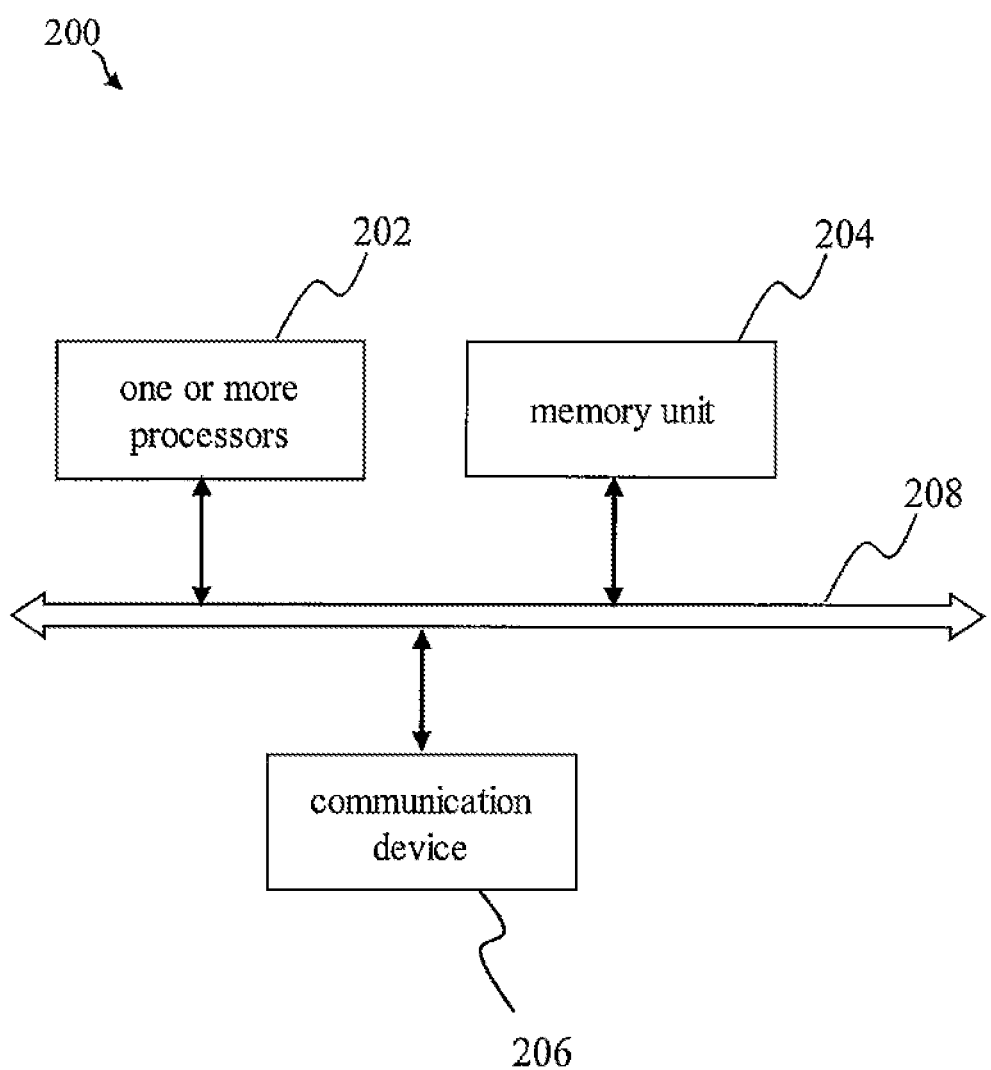
FIG. 2 an exemplary processing unit according to various embodiments.

FIG. 2 shows an exemplary processing unit 200 according to various embodiments. Each processing unit 112, 114, 116 of the two or more processing units 110 may be configured as described with respect to the processing unit 200 below. According to various aspects, the processing unit 200 may be a computer terminal. The processing unit 200 may include one or more processors 202. The processing unit 200 may include a memory unit 204. The processing unit 200 may include a communication device 206. The one or more processors 202, the memory unit 204, and the communication device 206 may be configured to communicate with each other via a communication bus 208. The processing unit 200 may be configured to communicate with the memory unit 102 via the communication link 120 using the communication device 206. According to various aspects, the communication link 120 may be a hard-wired communication link. For example, the communication link 120 may be the Internet (e.g., the communication interfaces and/or communication devices described herein may be interfaces connected to the Internet). The one or more processors 202 may be configured to execute tasks using the memory unit 204. According to various aspects, the processing unit 200 may include further interfaces (e.g., a display interface) communicating with the one or more processors 202, the memory unit 204, and the communication device 206 via the communication bus 208.

With respect to FIG. 1, the memory unit 102 may be configured to store map data 104. The map data 104 may include initially provided map data (e.g., downloaded from one or more servers). The map data 104 may include map data generated by the two or more processing units 110. According to various aspects, the memory unit 102 may be or may include a cloud server and the map data 104 may be stored in the cloud.

The memory unit 102 may be configured to store a task database 106. The task database 106 may include tasks for generating a vector tile of a selected map area (e.g., a selected squared map area). According to various aspects, one processing unit of the two or more processing units 110 may be configured to schedule the generation of a vector tile of a selected squared map area (see, for example, FIG. 3C). For example, the one processing unit (in some aspects referred to as scheduling processing unit) of the two or more processing units 110 may be configured to schedule the generation of the vector tile of the selected squared map area by determining tasks using a directed acyclic task graph (see, for example, FIG. 4). According to various aspects, the one processing unit of the two or more processing units 110 may be configured to determine tasks using the directed acyclic task graph. The one processing unit of the two or more processing units 110 may be configured to provide the determined task to the task database 106. In the following, for illustration the first processing unit 112 is described as being the one processing unit configured to schedule the generation of the vector tile. According to various aspects, the distributed computing system 100 may further include a monitoring unit. The monitoring unit may be configured to perform a heartbeat monitoring of each processing unit 112, 114, 116 of the two or more processing units 110 (e.g., pinging each processing unit). According to various aspects, each processing unit 112, 114, 116 of the two or more processing units 110 may be configured to schedule the generation of the vector tile, but only one processing unit selected as a scheduling processing unit may be permitted to schedule the generation of the vector tile. The distributed computing system 100 may further include a control unit. The control unit may be configured to select a scheduling processing unit (i.e., the one processing unit configured to schedule the generation of the vector tile) from the two or more processing units 110. For example, the first processing unit 112 may be the initially selected scheduling processing unit. The control unit may be further configured to receive information regarding the heartbeat monitoring from the monitoring unit. The control unit may be configured to, if the heartbeat monitoring indicates a connectivity loss (e.g., due to a server crash, e.g., due to a reboot) of the currently selected scheduling processing unit (e.g., the first processing unit 112), select another processing unit (e.g., the second processing unit 114, e.g., the third processing unit 116) of the two or more processing units 110 as scheduling processing unit. In this case, the selected other processing unit may be permitted to schedule the generation of the vector tile.

As described above, the two or more processing units 110 may be configured to execute tasks selected from the task database 106. Some of the tasks may relate to generating map data and the respective processing unit executing the task may be configured to store the generated map data as map data 104 in the memory unit 102 (e.g., via the communication link 120). Some of the tasks may relate to generating a vector tile (e.g., a vector sub-tile) and the respective processing unit executing the task may be configured to store the generated vector tile as a generated vector tile 108 in the memory unit 102 (e.g., via the communication link 120).

Figure 3A:
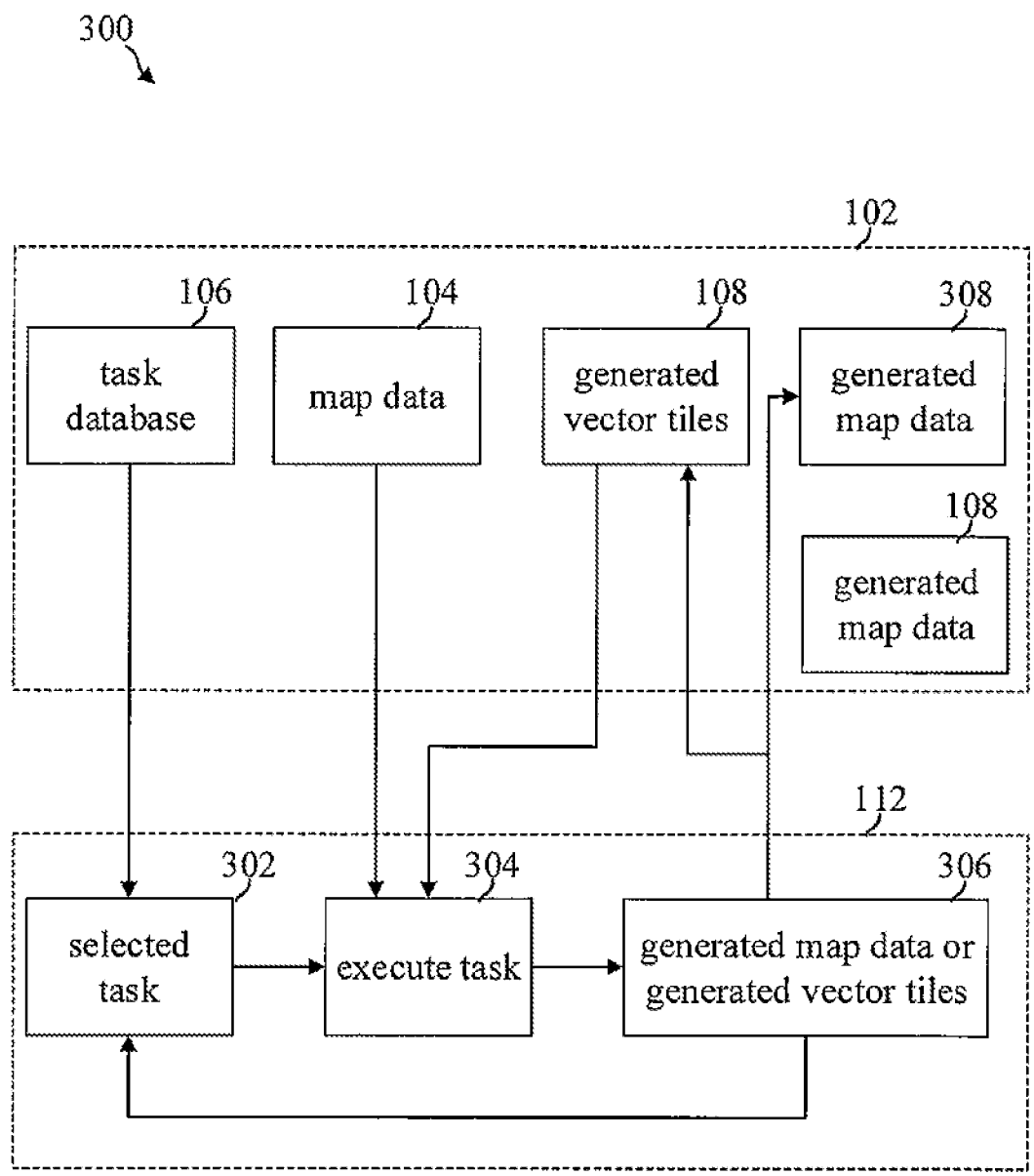
FIG. 3A to FIG. 3C each show an exemplary processing according to various embodiments.
Figure 3B:
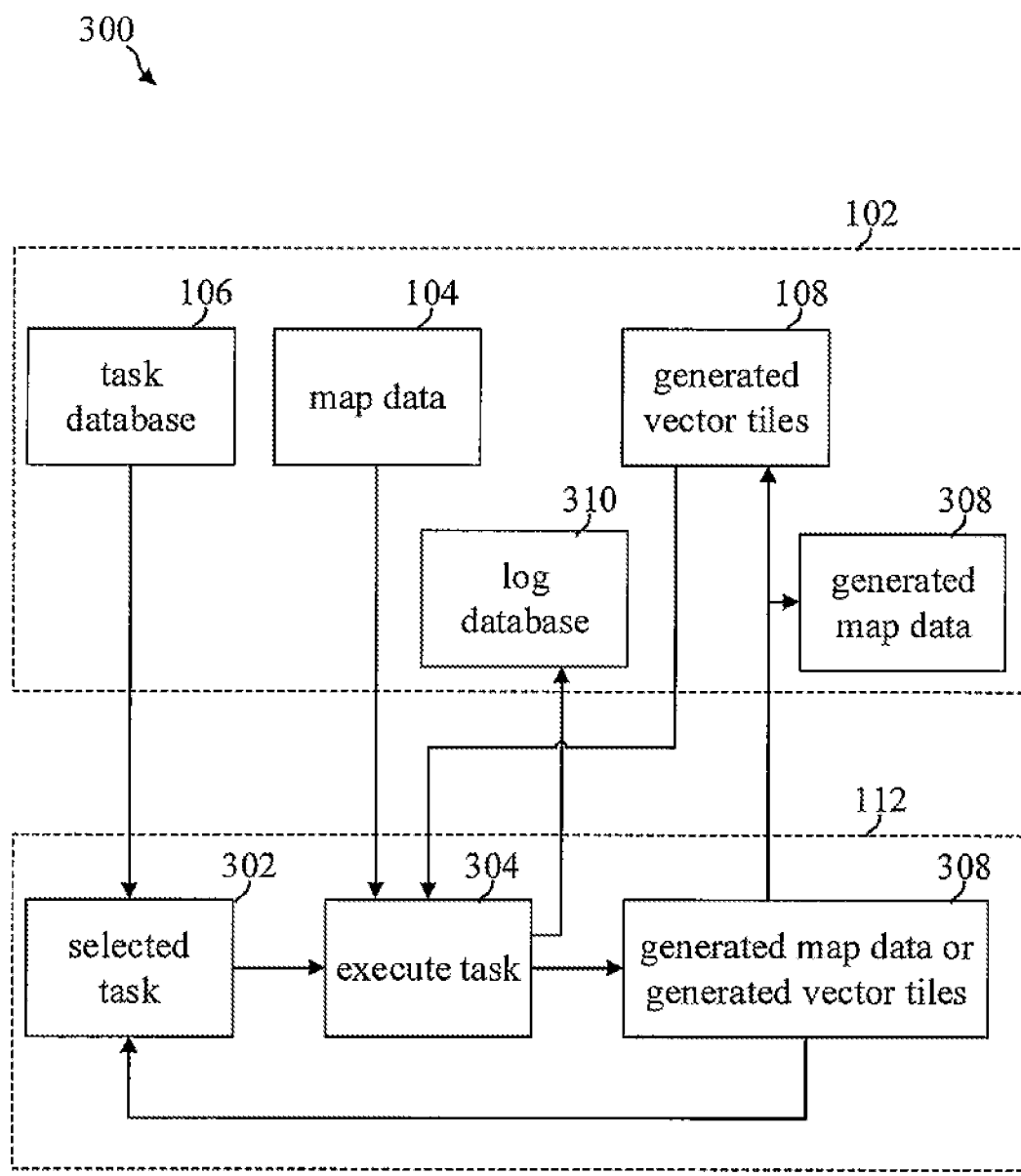
Figure 3C:
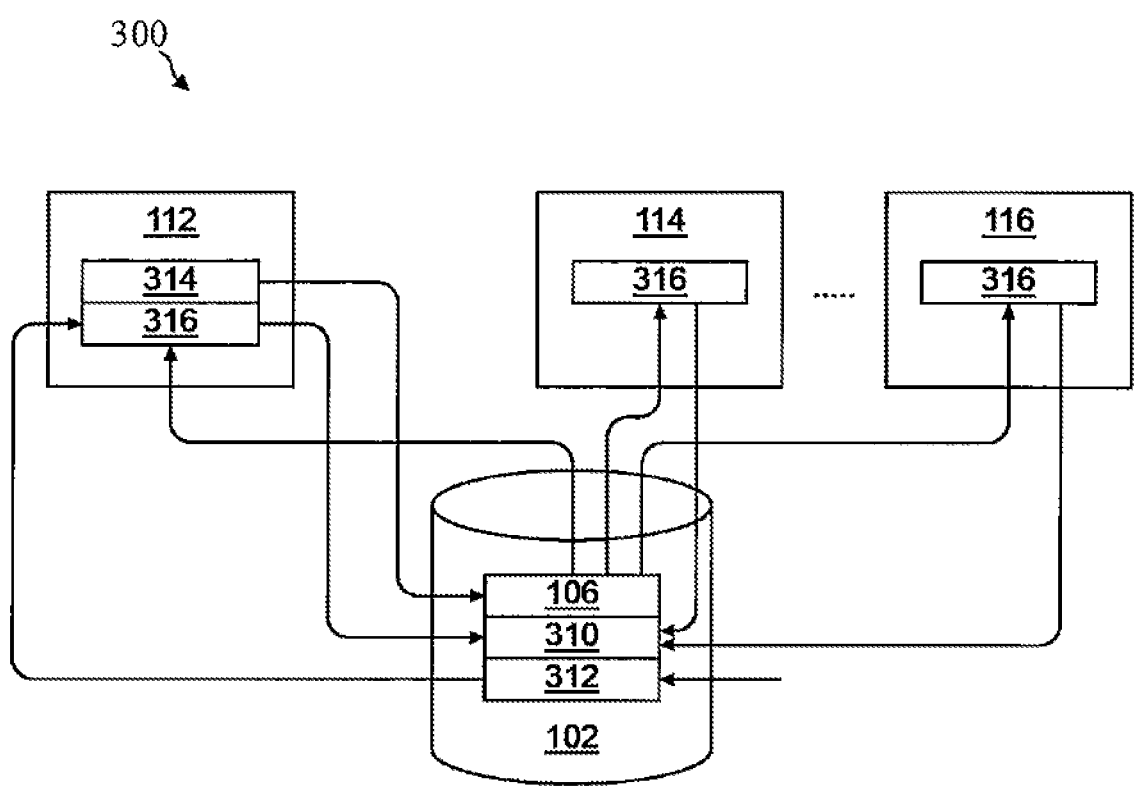

FIG. 3A, FIG. 3B, and FIG. 3C each show an exemplary processing 300 according to various embodiments. A processing unit, such as the first processing unit 112, may select a task 302 from the task database 106 and may execute 304 the task selected task 302. In some tasks, the execution 304 of the task 302 may be associated with processing map data 104 (e.g., previously generated map data 308) or with processing vector tiles 108 generated by prior tasks. Once a selected task 302 is executed 304 and the respective data (e.g., map data, e.g., vector tiles) are generated, the first processing unit 112 may be configured to select 302 the next task in the task database 106. In some tasks, map data or vector tiles 306 may be generated by executing 304 the task 302. The generated map data or vector tiles 306 may be stored in the memory unit 102 (e.g., via the communication link 120). According to various aspects, the memory unit 102 may be further configured to store a log database 310 (see, for example, FIG. 3B or FIG. 3C). Each processing unit 112, 114, 116 of the two or more processing units 110 may be configured to provide log data associated with the execution 304 of the selected task 302 to the log database 310 (see, for example, FIG. 3C). The log data may indicate whether a task was (e.g., successfully) finished or not. For example, the log data may indicate whether a task was halted, stopped (e.g., indicating execution errors), or finished. Illustratively, the distributed computing system 100, described herein, may be self-managed (by the employing the task-DAG 400, as described below) and may be capable to handle errors using the log data (e.g., repeat a task if the task is indicated as failed in the log database 310).

According to various aspects, the distributed computing system 100 may further include a plurality of server computers constituting a content delivery network (in some aspects referred to as content distribution network). The content delivery network may be configured to provide vector tiles generated as describe herein to user devices via a Web Map Tile Service (e.g., as specified by the Open Geospatial Consortium). As used herein, a user device (in some aspects also referred to as user terminal) may be any kind of device operable by a user, such as a personal computer, a laptop, a smartphone, a tablet, a smartwatch, etc. For example, a user device may be a mobile device, such as a smartphone or a tablet. The user device may include a screen configured to show a graphical user interface (GUI) of an app that the user of the user device has previously installed on the user device and has opened (i.e. started) to the app. The user device may employ the Web Map Tile Service (e.g., for browsing, e.g., for querying, e.g., for a spatial analysis, etc.) via the app.

With respect FIG. 3C, the memory unit 102 may store the task database 106, the log database 310, and an instruction database 312. The instruction database 312 may include instructions for which map area a vector tile is to be generated and/or which previously generated vector tile is to be updated. In this example, the first processing unit 112 may be selected as scheduling processing unit configured to perform the scheduling 314 of the generating of a vector tile. The first processing unit 112 may select instructions from the instruction database 312 for generating a vector tile and may schedule the generation of the vector tile associated with the instructions. The first processing unit 112 may schedule 314 the generating of the vector tile by determining tasks using the directed acyclic graph diagram (see, for example, FIG. 4) and may provide the determined tasks to the task database 106. Each processing unit 112, 114, 116 of the two or more processing units 110 may select a task from the task database 106 and may execute 316 the selected task. Each processing unit 112, 114, 116 may provide the respectively generated data to the memory unit 102. According to various aspects, the processing units 112, 114, 116 of the two or more processing units 110 may be configured to select and execute 316 the respective tasks substantially in parallel. For example, each processing unit may continuously select and execute tasks as long as tasks are included in the task database (hence, as long as the task database is not empty). The first processing unit 112 may be configured to determine tasks using the log data included in the log database 310. As mentioned above, the scheduling processing unit may be configured to determine the tasks using a directed acyclic task graph. Hence, a task may depend on one or more other tasks. For example, scheduling processing unit (the first processing unit 112) may be configured to determine, if the log database 310 includes a task indicated as finished. The scheduling processing unit may be configured to, if a task is indicated as finished in the log database 310, determine one or more tasks directly dependent on the finished task. The scheduling processing unit may be configured to determine for each task of the one or more tasks, if each task the respective task depends on is indicated as finished and if each task is finished provide the respective task of the one or more tasks to the tasks database 106.

Figure 3D:
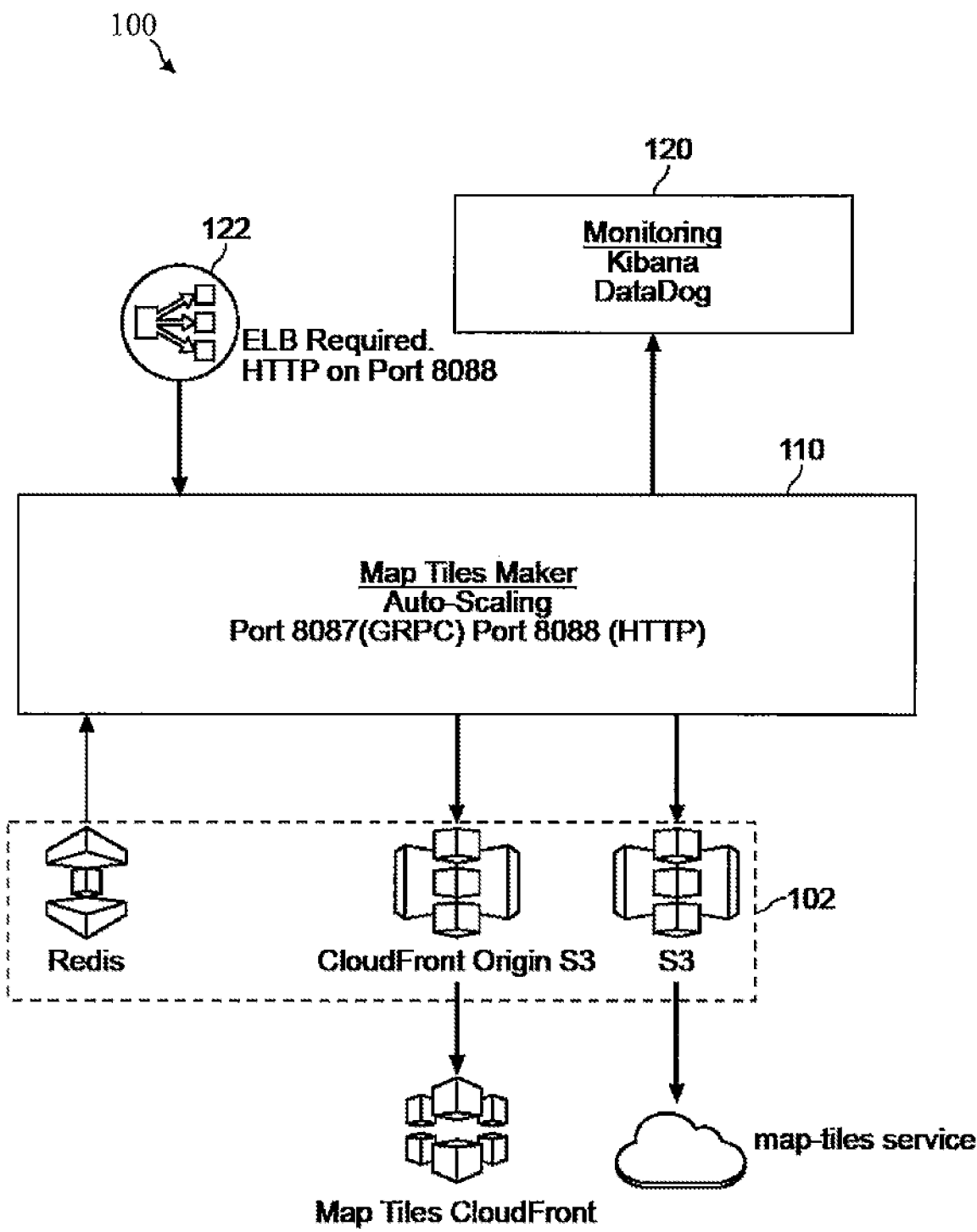
FIG. 3D shows an exemplary distributed computing system according to various embodiments.

FIG. 3D shows an exemplary distributed computing system 100 according to various embodiments. In this example, the memory unit 102 and the two or more processing units 110 may be part of an Amazon AWS Elastic Compute Cloud (EC2). The memory unit 102 may include a (memory shared) Redis database. The Redis database may include the task database 106, the log database 310, and the instruction database 312. According to various aspects, the control unit may be part of the Redis database, wherein the Redis database may assign a unique and exclusive token to one of the two or more processing units 110 and the token may indicate the scheduling processing unit. Hence, the processing unit the token is assigned to may be the scheduling processing unit. The monitoring unit 120 may perform the heartbeat monitoring as described above. If a connectivity loss of the scheduling processing unit is detected, the Redis database may assign the token to another processing unit. The monitoring unit may include monitoring platforms, such as Kibana and/or DataDog. The distributed computing system 100 may further include an elastic load balancer (ELB) 122. The ELB 122 may be configured to distribute incoming application traffic across multiple targets (e.g., the two or more processing units 110). The ELB 122 may be configured to balance a load of requests with respect to generating and updating map tiles (e.g., providing the instructions to the instruction database 312 of the memory unit 102).

The memory unit 102 may further include an S3 storage configured to store the generated vector tiles. According to various aspects, the S3 storage may be part of a content delivery network (CDN) configured to provide generated vector tiles. The S3 storage may be used for providing generated vector tiles via a Web Map Tile Service (WMTS).

Figure 4:
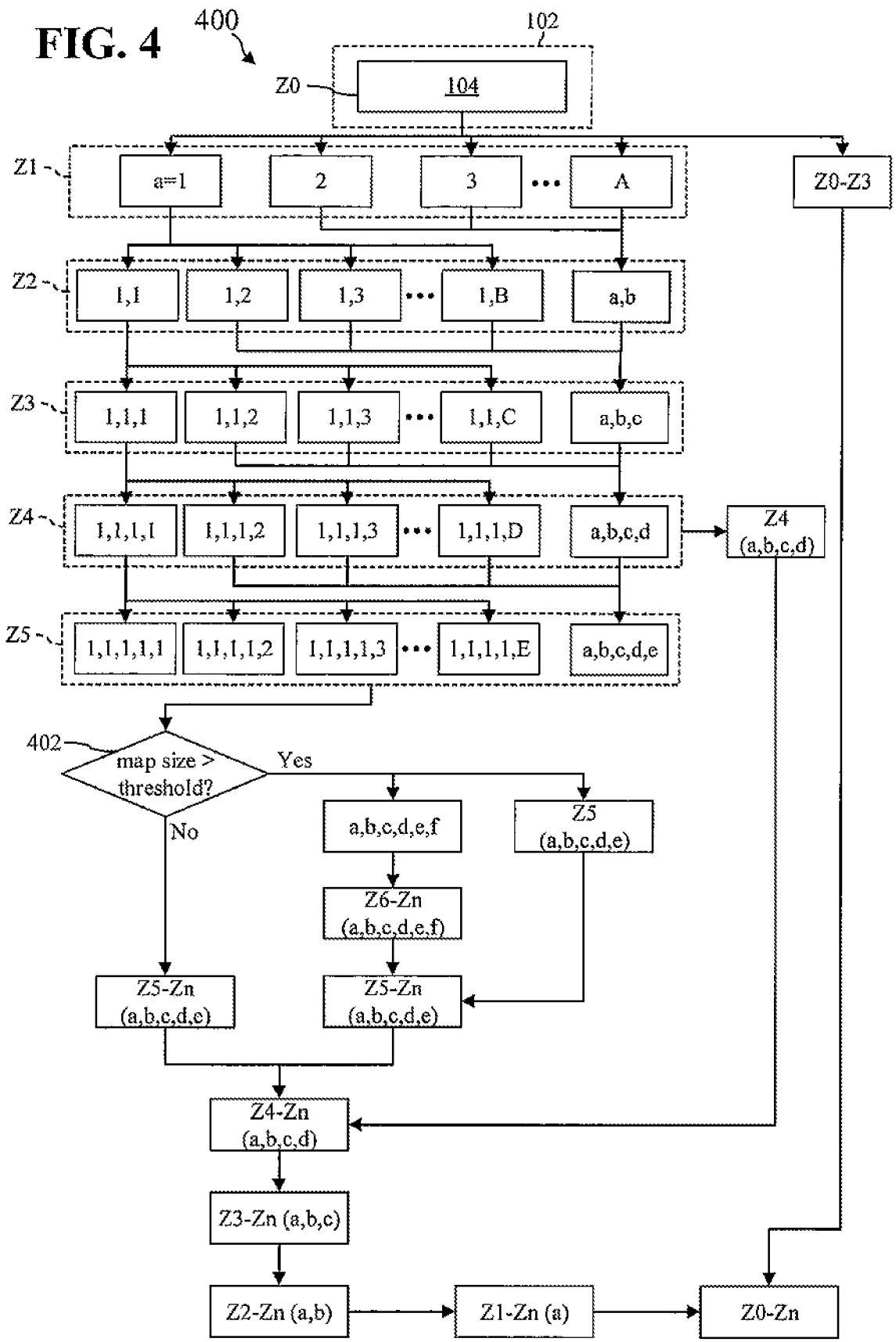
FIG. 4 shows a directed acyclic task graph according to various embodiments.

FIG. 4 shows a directed acyclic task graph (task-DAG) 400 according to various embodiments. As described above, the scheduling processing unit may be configured to schedule the generation of a vector tile of a selected squared map area using a task-DAG, such as the task-DAG 400. Illustratively, the scheduling processing unit may generate a vector tile by applying a divide-and-conquer algorithm using the task-DAG 400, which breaks the generation of a vector tile down into a plurality of sub-problems. These sub-problems may have a related type (e.g., obtaining map data, rendering map data, and/or merging map data, as describe below) and each sub-problem (i.e., a task) may be solved directly by a processing unit.

Various aspects refer to vector tiles, which represent a "squared" map area. However, it is noted that a vector tile may also be generated for differently shaped map areas, such as a rectangular map area.

The task-DAG 400 may include a plurality of tasks, wherein a task of the plurality of tasks may depend on one or more other task of the plurality of tasks. The scheduling processing unit may be configured to determine a task once each task the respective task depends on is finished and may provide the determined task to the task database 106. In the following, the plurality of tasks included in the task-DAG 400 as well as their dependencies will be described. The arrows in the task-DAG 400 may indicated the dependencies between the plurality of tasks.

Various aspects, as described below, refer to a non-zoomed level Z0 and a plurality of zoom levels Z1 to Zn. The plurality of zoom levels Z1 to Zn may be consecutively number from a first zoom level Z1 to an n-th zoom level Zn. According to various aspects, "n" may be any integer greater than or equal to 6 (i.e., n≥6). For example, the plurality of zoom levels may include fourteenth (n=14), fifteen (n=15), sixteen (n=16), etc. zoom levels. In some aspects the non-zoomed level Z0 may be referred to as zoom level Z0. Each zoom level of the plurality of zoom levels Z1 to Zn may be associated with a higher resolution (e.g., in m/pixel) and a higher number of details than the previous zoom level. For example, the fourth zoom level Z4 may have a higher resolution and a higher number of details than the third zoom level Z3 and the fifth zoom level Z5 may have a higher resolution and a higher number of details than the fourth zoom level Z4, etc. According to various aspects, a respective zoom level may illustrate a map area and the next zoom level may illustrate a segment of the map area with a higher resolution (e.g., less meter per pixel) and a higher number of details. As used herein, the term "number of details" may refer to specific map features, which may be shown in a map area. A higher number of details may refer to additional small scale features. A first map area may show, for example, large scale features, such as oceans and continents, as details and a second map area having a higher number details may in addition to the oceans and continents show features in a smaller scale (e.g., smaller features), such as hills, national parks, or buildings on the continents.

The map data 104 may represent a selected map area at the non-zoomed level Z0 and at the plurality of zoom levels Z1 to Zn. The squared map area may be, for example, a world map.

The map data 104 may be included (e.g., stored) in the memory unit 102. According to various aspects, the map data 104 may be provided by a map data source server (e.g., OpenStreetMap, e.g., OpenTerra) and various tasks as described below may be performed by employing the map data source server. According to various aspects, the non-zoomed level Z0 and the plurality of zoom levels Z1 to Zn, as described herein, may refer to the zoom levels provided by the map data source server. For example, the map data source server may be OpenStreetMap and/or OpenTerra and the non-zoomed level Z0 and the plurality of zoom levels Z1 to Zn may refer to the zoom levels provided by OpenStreetMap and/or OpenTerra.

Figure 5A:
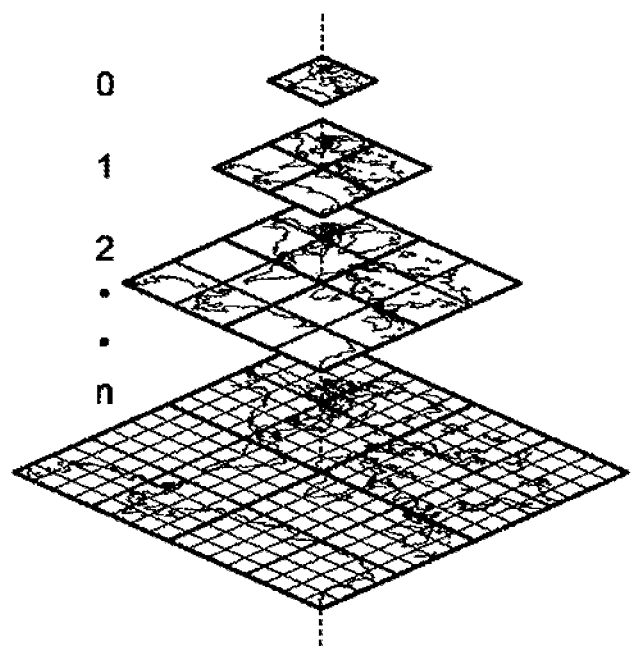
FIG. 5A shows an exemplary configuration of a vector tile including various zoom levels, according to various embodiments.
Figure 5A:
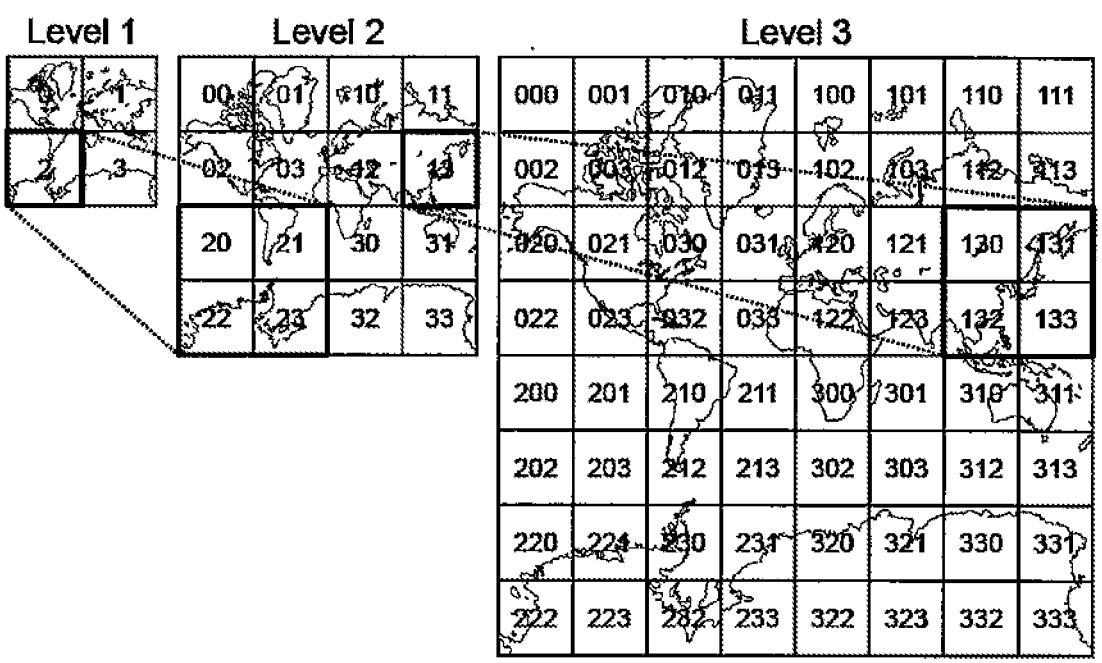

Various tasks in the task-DAG 400 may include a dividing of a map area at a respective zoom level into a predefined number of map subareas associated with a zoom level subsequent to the respective zoom level. According to various aspects, the map subareas associated with the same map (sub)area may have the same size. According to various aspects, at least some of the predefined numbers may be different from the other predefined numbers. Each predefined number, as used herein, may be an integer number greater than one. According to various aspects, all predefined numbers may be equal to each other. For example, each predefined number may be equal to four, as shown exemplarily in FIG. 5A, which illustrates an exemplary configuration 500A (in some aspects referred to as pyramid model) of a vector tile including various zoom levels from Z0 to Zn. Illustratively, the vector tile including the zoom levels from Z0 to Zn may include a set of vector tiles (in some aspects referred to as vector tile set) and the set of vector tiles may include several vector tiles at each zoom level. For example, the non-zoomed level Z0 may show a map area represented by a single vector tile, the first zoom level Z1 may include four vector tiles, wherein each of the four vector tiles may represent a quarter of the map area, the second zoom level Z2 may include sixteen vector tiles, wherein each of the sixteen vector tiles may represent a quarter of a map area corresponding to one of the four vector tiles of the first zoom level Z1, etc. Hence, the world map may be covered by a single vector tile at Z0 and may (in the case that each predefined number is equal to four) be covered at each zoom level Z from 1 to n by $2^n$ times $2^n$ vector tiles (i.e., each zoom level may be associated with $2^{2n}$ vector tiles), wherein each of the vector tiles may cover a part of the world map.

With respect to FIG. 4, the map data 104 may represent a squared map area at the non-zoomed level Z0. The dividing of a map area at a respective zoom level into a predefined number of map subareas (e.g., the map subareas having the same size) associated with the zoom level is exemplarily shown in FIG. 5B for a dividing into four map subareas. For illustration, the squared map area may be the world map. In the following the task-DAG 400 is described, wherein by way of illustration reference is made to examples shown in FIG. 5B, FIG. 5C, and FIG. 5D. Each box shown in FIG. 4 may represent one or more tasks of the plurality of tasks associated with the task-DAG 400.

Figure 5B:
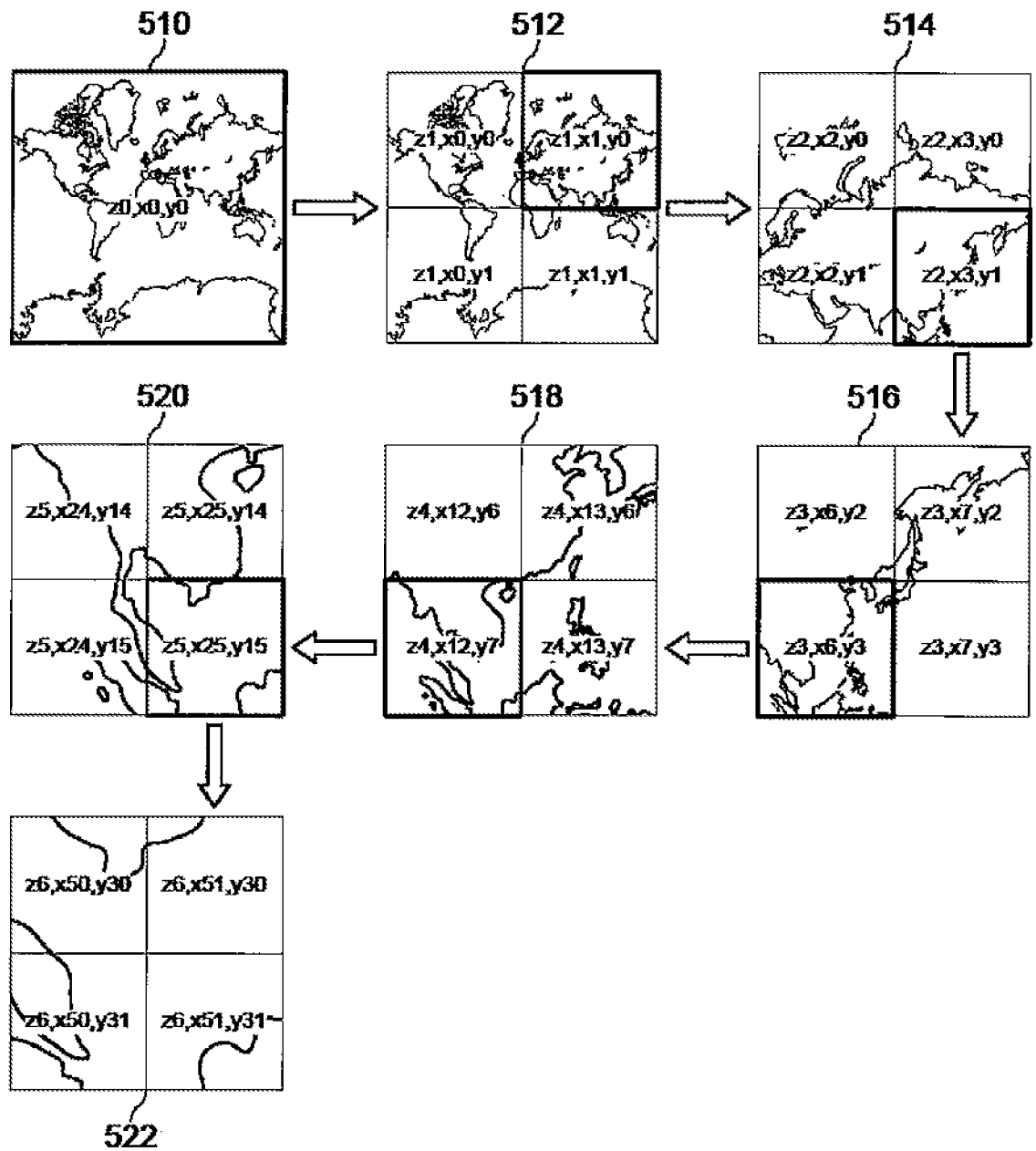
FIG. 5B shows an example for dividing a squared map area in squared map subareas, according to various embodiments.

The squared map area at the non-zoomed level Z0 may be divided into a predefined number, A, of squared map subareas associated with the first zoom level Z1. The task-DAG 400 may, for each squared map subarea, a, of the squared map subareas, a=1–A, include a task of obtaining map data representing the respective squared map subarea, a, at the first zoom level Z1. Illustratively, a task of obtaining map data representing the respective squared map subarea, a, may be a task of cutting the respective squared map subarea, a, from the squared map area represented with the first zoom level Z1. The obtaining of respective map data (e.g., by cutting), as described herein, may be performed using the tool Osmium. The squared map subareas at each zoom level Z1 to Zn may be regularly organized in rows and columns with associated coordinates. The obtaining of respective map data (e.g., by cutting) may be performed using these coordinates. An exemplary dividing of a squared map area 510 into A=4 squared map subareas 512 ((z1, x0, y0); (z1, x1, y1); (z1, x0, y1); and (z1, x1, y1)) is shown in FIG. 5B. The z-coordinate may refer to the zoom level. According to various aspects, the dividing of a respective map area, as described herein, may be a task of the task-DAG 400. According to various aspects, the scheduling processing unit may be configured to perform the dividing of a respective map area. The dividing of a respective map area map be associated with determining coordinates of each of the associated subareas. The scheduling processing unit may be configured to determine the respective coordinates and to provide, for each map subarea, a respective task for obtaining the map data of the respective map subarea to the task database 106.

Each squared map subarea, a, of the squared map subareas, a=1-A, at the first zoom level Z1 may be divided into a predefined number, B, of squared map subareas associated with the second zoom level Z2. Hence, each squared map subarea associated with the second zoom level Z2 may correspond to a squared map subarea, a, associated with the first zoom level. Each squared map subarea associated with the second zoom level Z2 may be described as squared map subarea (a, b) with a=1-A, b=1-B. The task-DAG 400 may, for each squared map subarea (a, b) of the squared map subareas (a=1-A, b=1-B), include a task of obtaining map data representing the respective squared map subarea (a, b) at the second zoom level Z2. See FIG. 5B as an example for A=4, B=4, wherein the squared map subarea (z1, x1, y0) of the squared map subareas 512 is divided into B=4 squared map subareas 514 ((z2, x2, y0); (z2, x3, y0); (z2, x2, y1); and (z2, x3, y1)). FIG. 4 exemplarily shows the boxes associated with the tasks for the squared map subareas (a=1, 1-B), whereas the respective tasks for the squared map subareas (a=2-A, b=1-B) are illustrated by (a, b).

Each squared map subarea, b, of the squared map subareas (a=1-A, b=1-B) at the second zoom level Z2 may be divided into a predefined number, C, of squared map subareas associated with the third zoom level Z3. The task-DAG 400 may, for each squared map subarea (a, b, c) of the squared map subareas (a=1-A, b=1-B, c=1-C), include a task of obtaining map data representing the respective squared map subarea (a, b, c) at the third zoom level Z3. See FIG. 5B as an example for A=4, B=4, C=4, wherein the squared map subarea (z2, x3, y0) of the squared map subareas 514 at the second zoom level Z2 is divided into C=4 squared map subareas 516 ((z3, x6, y2); (z3, x7, y2); (z3, x6, y3); and (z3, x7, y3)). FIG. 4 exemplarily shows the boxes associated with the tasks for the squared map subareas (a=1, b=1, c=1-C), whereas the other tasks for the squared map subareas (a=1-A, b=1-B, c=1-C\a=1 and b=1) are illustrated by (a, b, c).

The task-DAG 400 may include a task of rendering the map data representing the selected squared map area from the non-zoomed level Z0 to the third zoom level Z3 (i.e., the non-zoomed level Z0, the first zoom level, Z1, the second zoom level Z2, and the third zoom level Z3) to generate a vector tile Z0-Z3 associated with the non-zoomed to third zoom levels. Illustratively, the generated vector tile may be a vector tile set including a plurality of vector tiles and each vector tile may be associated with a respective zoom level and with a respective map subarea at the zoom level. For example, the vector tile Z0-Z3 may include a respective vector tile for each map subarea a=1-A at the first zoom level, a respective vector tile for each map subarea a=1-A, b=1-B at the second zoom level, and a respective vector tile for each map subarea a=1-A, b=1-B, c=1-C at the third zoom level. According to various aspects, the map data from the non-zoomed level Z0 to the third zoom level Z3 may include large scale features, such as land area, national borders, oceans, lakes, rivers, etc. Illustratively, the vector tile Z0-Z3 associated with the non-zoomed to third zoom levels may be generated (rendered) in a single task.

The rendering of map data, as described herein, is associated with a respective map area. As used herein, the term "rendering" in combination with map data representing a map area or in combination with a map area may refer to the generation of a vector tile associated with the respective map area. The rendering may be used to generate a vector tile associated with a specific zoom level or may be associated with a range of zoom levels. In the case that the vector tile generated by rendering is described as being associated with a range of zoom levels, the vector is understood as being a vector tile set which includes all vector tiles associated with each map subarea within the associated range of zoom levels. According to various aspects, the tool OpenMapTiles may be employed for the rendering described herein. In some aspects, one or more of the following tools may be employed for the rendering: ArcGIS, OSM2VectorTiles, OpenMapTiles and/or OpenLayers.

Each squared map subarea, c, of the squared map subareas (a=1-A, b=1-B, c=1-C) at the third zoom level Z3 may be divided into a predefined number, D, of squared map subareas associated with the fourth zoom level Z4. The task-DAG 400 may, for each squared map subarea (a, b, c, d) of the squared map subareas (a=1-A, b=1-B, c=1-C, d=1-D), include a task of obtaining map data representing the respective squared map subarea (a, b, c, d) at the fourth zoom level Z4. See FIG. 5B as an example for A=4, B=4, C=4, D=4, wherein the squared map subarea (z3, x6, y3) of the squared map subareas 516 at the third zoom level Z3 is divided into D=4 squared map subareas 518 ((z4, x12, y6); (z4, x13, y6); (z4, x12, y7); and (z4, x13, y7)). FIG. 4 exemplarily shows the boxes associated with the tasks for the squared map subareas (a=1, b=1, c=1, d=1-D), whereas the other tasks for the squared map subareas (a=1-A, b=1-B, c=1-C, d=1-D\a=1, b=1, and c=1) are illustrated by (a, b, c, d).

The task-DAG 400 may, for each squared map subarea (a, b, c, d) of the squared map subareas (a=1-A, b=1-B, c=1-C, d=1-D) at the fourth zoom level Z4, include a task of rendering the respectively obtained map data to generate a respective vector tile associated with the fourth zoom level Z4. Hence, a number of generated vector tiles Z4 (*a, b, c, d*) associated with the fourth zoom level Z4 is equal to A*B*C*D.

Each squared map subarea, d, of the squared map subareas (a=1-A, b=1-B, c=1-C, d=1-D) at the fourth zoom level Z4 may be divided into a predefined number, E, of squared map subareas associated with the fifth zoom level Z5. The task-DAG 400 may, for each squared map subarea (a, b, c, d, e) of the squared map subareas (a=1-A, b=1-B, c=1-C, d=1-D, e=1-E), include a task of obtaining map data representing the respective squared map subarea (a, b, c, d, e) at the fifth zoom level Z5. See FIG. 5B as an example for A=4, B=4, C=4, D=4, E=4, wherein the squared map subarea (z4, x12, y7) of the squared map subareas 518 at the fourth zoom level Z4 is divided into E=4 squared map subareas 520 ((z5, x24, y14); (z5, x25, y14); (z5, x24, y15); and (z5, x25, y15)). FIG. 4 exemplarily shows the boxes associated with the tasks for the squared map subareas (a=1, b=1, c=1, d=1, e=1-E), whereas the other tasks for the squared map subareas (a=1-A, b=1-B, c=1-C, d=1-D, e=1-E\a=1, b=1, c=1, and d=1) are illustrated by (a, b, c, d, e).

The task-Dag 400 may, for each squared map subarea (a, b, c, d, e) of the squared map subareas (a=1-A, b=1-B, c=1-C, d=1-D, e=1-E) at the fifth zoom level Z5, include a determining 402, if a data size of the respectively obtained map data is greater than a threshold value or not. According to various aspects, the scheduling processing unit may be configured to determine 402, if a data size of the respectively obtained map data associated with the fifth zoom level Z5 is greater than the threshold value.

Figure 5C:
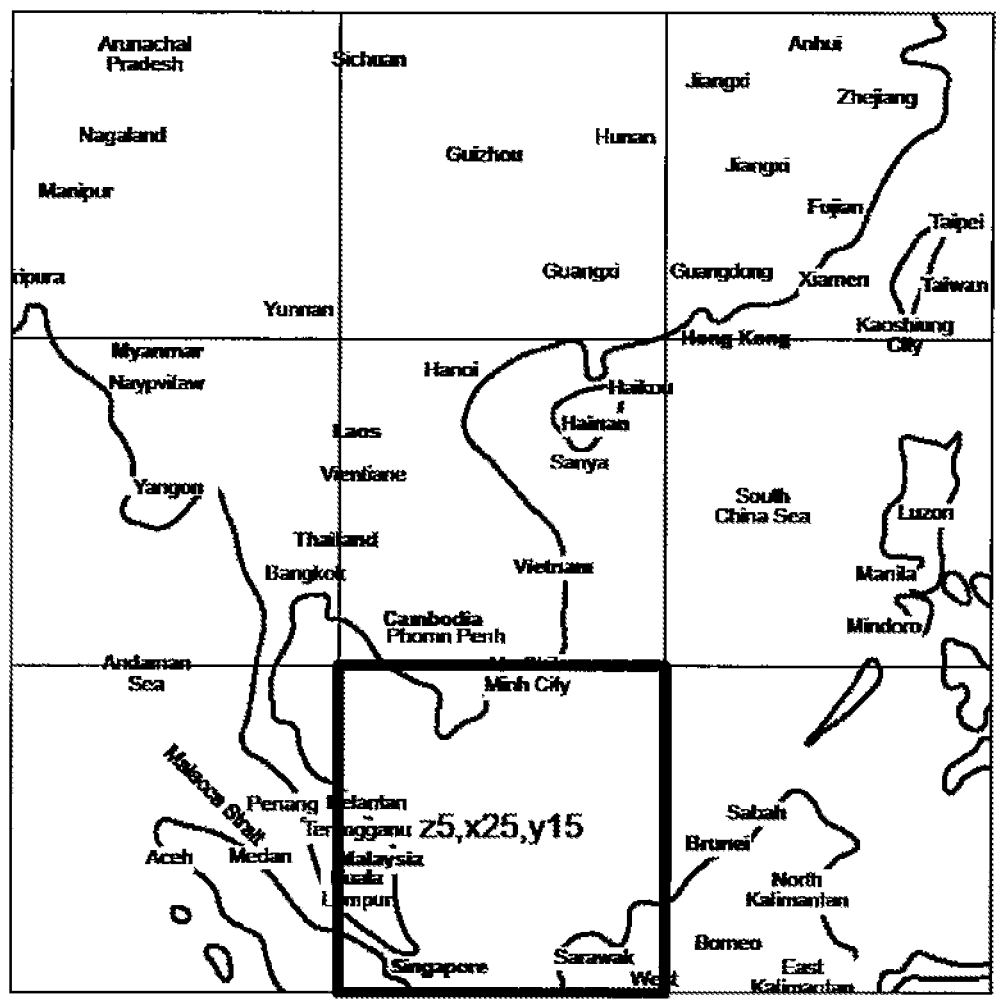
FIG. 5C shows an example of a vector tile obtained by rendering a squared map area, according to various embodiments.

The task-Dag 400 may include a task of rendering the obtained map data from the fifth zoom level Z5 to the n-th zoom level Zn to (generate) a respective vector tile (e.g., a respective vector tile set as described above) associated with the fifth to n-th zoom levels Z5-Zn in the case that the data size of the map data of the respective squared map subarea (a, b, c, d, e) is not greater than the threshold value ("No" in 402). Hence, a number of generated vector tiles Z5-Zn (a, b, c, d, e) associated with the fifth to n-th zoom levels is equal to A*B*C*D*E. An example of the vector tile (z5, x25, y15) obtained by rendering the associated squared map area is shown in FIG. 5C. Each vector tile (set) Z5-Zn (a, b, c, d, e) associated with the fifth to n-th zoom levels may include the vector tiles at each zoom level from the fifth to n-th zoom levels Z5-Zn. At each zoom level each map subarea associated with the previous zoom level may be divided into a predefined number, as described herein. According to various aspects, the predefined number may be equal for each zoom level from the fifth zoom level Z5 to n-th zoom levels Zn (e.g., equal to four).

The denotation "*", as used in the following with respect to an index of a squared map subarea, may indicate a specific selected index. For example, a squared map subarea (a, b) may refer to any squared map subarea of the squared map subareas (a=1-A, b=1-B), whereas a squared map subarea (a*, b) may refer to the squared map subareas of the squared map areas (a=a*, b=1-B) associated with the same squared map subarea, a*.

The task-Dag 400 may, in the case that the data size of the map data of a squared map subarea (a=a*, b=b*, c=c*, d=d*, e=e*) is greater than the threshold value ("Yes" in 402), include a dividing of the squared map subarea (a*, b*, c*, d*, e*) into a predefined number, F, of squared map subareas associated with the sixth zoom level Z6. The task-DAG 400 may, for each squared map subarea (a*, b*, c*, d*, e*, f) of the squared map subareas (a*, b*, c*, d*, e*, f=1-F), include a task of obtaining map data representing the respective squared map subarea (a*, b*, c*, d*, e*, f) at the sixth zoom level Z6. See FIG. 5B as an example for A=4, B=4, C=4, D=4, E=4, F=4, wherein the squared map subarea (z5, x25, y15) of the squared map subareas 520 at the fifth zoom level Z5 is divided into F=4 squared map subareas 522 ((z6, x50, y30); (z6, x51, y30); (z6, x50, y31); and (z6, x51, y31)). FIG. 4 exemplarily shows a box associated with the tasks for the squared map subareas (a, b, c, d, e, f) at the sixth zoom level Z6 for which the associated map data at the fifth zoom level Z5 have a data size greater than the threshold value.

According to various aspects, the task-Dag 400 may, for each squared map subarea (a*, b*, c*, d*, e*, f), include a task of rendering the obtained map data from the sixth zoom level Z6 to the n-th zoom level Zn to (generate) a respective vector tile Z6-Zn (a*, b*, c*, d*, e*, f) (e.g., a respective vector tile set as described above) associated with the sixth to n-th zoom levels Z6-Zn. The task-Dag 400 may, in the case that the data size of the map data of a squared map subarea (a*, b*, c*, d*, e*) is greater than the threshold value, include a task of rendering the map data obtained for the squared map subarea (a*, b*, c*, d*, e*) to generate a vector tile Z5 (a*, b*, c*, d*, e*) associated with the fifth zoom level Z5. The task-Dag 400 may further include a task of merging the vector tile Z5 (a*, b*, c*, d*, e*) associated with the fifth zoom level Z5 and the vector tiles Z6-Zn (a*, b*, c*, d*, e*, f) associated with the sixth to n-th zoom levels Z6-Zn to generate a vector tile Z5-Zn (a*, b*, c*, d*, e*) associated with the fifth to n-th zoom levels Z5-Zn.

As used herein, the term "merging" may relate to a combining of two or more vector tiles to a combined (i.e., merged) vector tile. As used herein, the term "vector tile" may also refer to a vector tile set of a plurality of vector tiles. A vector tile may refer to a vector tile or vector tile set having a vector tile format. For example, a first vector tile (or vector tile set) may be stored in the memory as a first file having a vector tile format and a second vector tile (or vector tile set) may be stored in the memory as a second file having the vector tile format and the vector tiles may be merged to a vector tile represented by a single file having the vector tile format. Illustratively, the merged vector tile may be a vector tile set including the first vector tile and the second vector tile. The above described merging of the vector tile Z5 (a*, b*, c*, d*, e*) and the vector tiles Z6-Zn (a*, b*, c*, d*, e*, f) may serve as an example: Each vector tile Z6-Zn (a*, b*, c*, d*, e*, f) may be a vector tile set including all vector tiles from the sixth zoom level Z6 to the n-th zoom level Zn with a predefined number (e.g., four) of map subareas at each zoom level Z7 to Zn and all vector tile sets Z6-Zn (a*, b*, c*, d*, e*, f=1-F) may be merged with the vector tile Z5 (a*, b*, c*, d*, e*) to generate a vector tile set including all vector tiles from the fifth zoom level Z5 to the n-th zoom level Zn.

As an illustrative example, the data size of the squared map subarea (1, 1, 1, 1, 1) may not be greater than the threshold value such that in a single task a vector tile Z5-Zn (1, 1, 1, 1, 1) is rendered and the data size of the squared map subarea (1, 1, 1, 1, 2) may be greater than the threshold value such that for a number of F squared map subareas (1, 1, 1, 2, f=1-F) respective map data area obtained in F different first tasks, that for each squared map subareas (1, 1, 1, 2, f=1-F) a respective vector tile Z6-Zn (1, 1, 1, 1, 2, f=1-F) is rendered in F different second tasks, that a vector tile Z5 (1, 1, 1, 1, 2) is rendered in a third task, and that the F vector tiles Z6-Zn (1, 1, 1, 1, 2, f=1-F) and the vector tile Z5 (1, 1, 1, 1, 2) are merged to a vector tile Z5-Zn (1, 1, 1, 1, 2). Hence, if the data size of a squared map subarea (a, b, c, d, e,) is not greater than the threshold value, a vector tile Z5-Zn (a, b, c, d, e) is generated in a single task, whereas, if the data size of the squared map subarea (a, b, c, d, e,) is greater than the threshold value, the vector tile Z5-Zn (a, b, c, d, e) is generated in 2F+2 tasks.

Figure 5D:
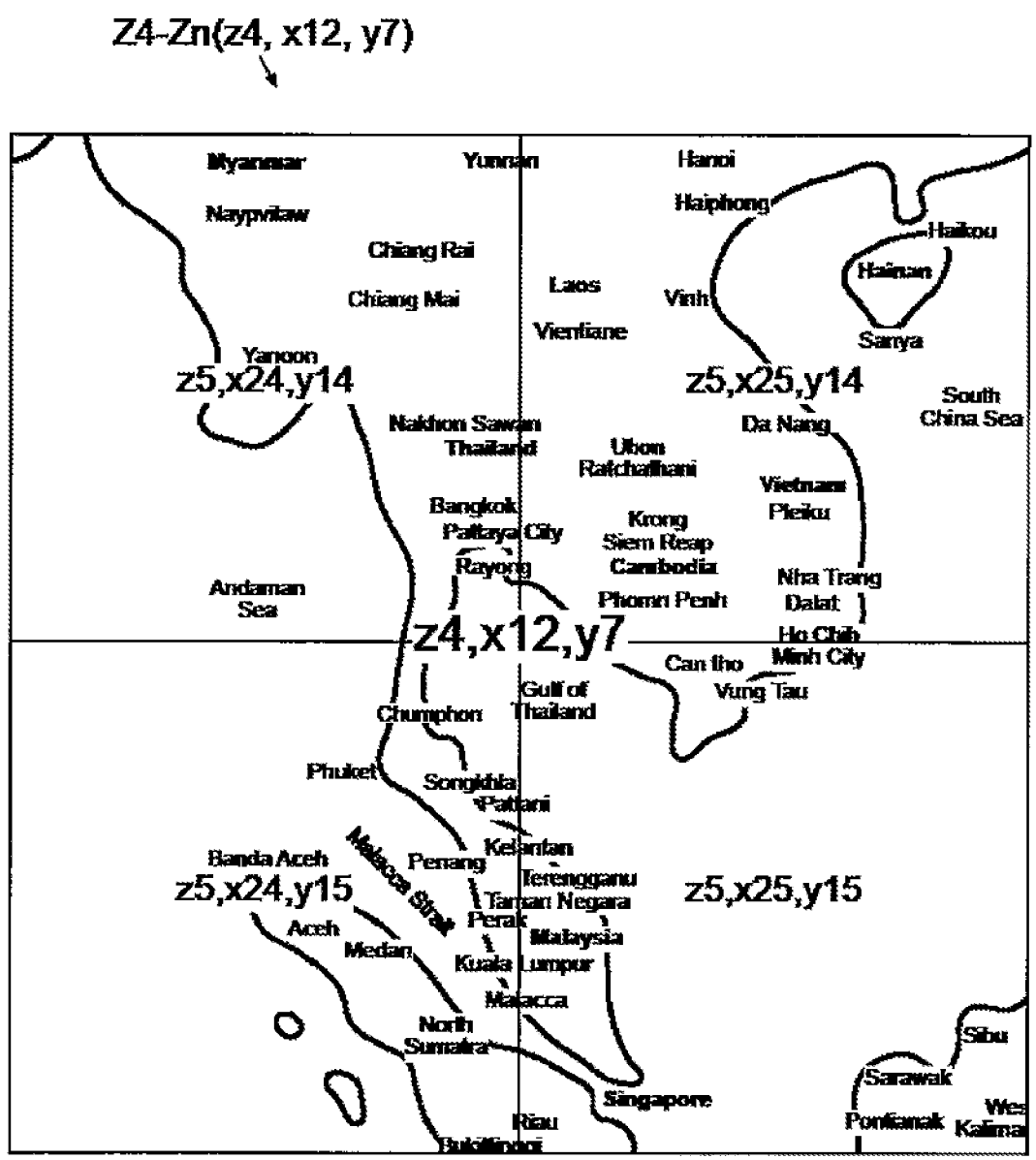
FIG. 5D shows an example of a vector tile obtained by merging multiple vector tiles, according to various embodiments.

The task-Dag 400 may, for each generated vector tile Z4 (a*, b*, c*, d*) of the generated vector tiles Z4 (*a, b, c, d*) associated with the fourth zoom level Z4, include a task of merging the respective vector tile Z4 (a*, b*, c*, d*) and the vector tiles Z5-Zn (a*, b*, c*, d*, e=1-F) associated with the fifth to n-th zoom levels Z5-Zn corresponding to the respective vector tile Z4 (a*, b*, c*, d*) to generate a respective vector tile Z4-Zn (a*, b*, c*, d*) associated with the fourth to n-th zoom levels Z4-Zn. Hence, the vector tiles Z5-Zn (a*, b*, c*, d*, e=1–F) corresponding to the respective vector tile Z4 (a*, b*, c*, d*) may be the vector tiles corresponding to the squared map subareas at the fifth zoom level Z5, which are part of the respective squared map subarea at the fourth zoom level Z4. An example of a vector tile Z4-Zn (z4, x12, y7) associated with the fourth to n-th zoom levels Z4-Zn obtained by merging the vector tile Z4 (z4, x12, y7) associated with the fourth zoom level and the vector tiles Z5-Zn ((z5, x24, y14), (z5, x25, y14), (z5, x24, y15), (z5, x25, y15)) associated with the fifth to n-th zoom levels Z5-Zn is shown in FIG. 5D.

The task-Dag 400 may, for each squared map subarea (a*, b*, c*) of the squared map subareas (a=1–A, b=1–B, c=1–C) at the third zoom level Z3, include a task of merging the vector tiles Z4-Zn (a*, b*, c*, d=1–D) associated with the fourth to n-th zoom levels Z4-Zn corresponding to the respective vector tile Z3 (a*, b*, c*) to generate a respective vector tile Z3-Zn (a*, b*, c*) associated with the third to n-th zoom levels Z3-Zn.

The task-Dag 400 may, for each squared map subarea (a*, b*) of the squared map subareas (a=1–A, b=1–B) at the second zoom level Z2, include a task of merging the vector tiles Z3-Zn (a*, b*, c=1–C) associated with the third to n-th zoom levels Z3-Zn corresponding to the respective vector tile Z2 (a*, b*) to generate a respective vector tile Z2-Zn (a*, b*) associated with the second to n-th zoom levels Z2-Zn.

The task-Dag 400 may, for each squared map subarea (a*) of the squared map subareas (a=1–A) at the first zoom level Z1, include a task of merging the vector tiles Z2-Zn (a*, b=1–B) associated with the second to n-th zoom levels Z2-Zn corresponding to the respective vector tile Z1 (a*) to generate a respective vector tile Z1-Zn (a*) associated with the first to n-th zoom levels Z1-Zn.

The task-Dag 400 may include a task of merging the vector tile Z0-Z3 associated with the non-zoomed to third zoom levels and all vector tiles Z1-Zn (a=1–A) associated with the first to n-th zoom levels Z1-Zn to generate the vector tile Z0-Zn of the selected squared map area associated with each of the non-zoomed level Z0 to n-th zoom level Zn.

A*BA*B*CA*B*C*DA*B*C*DA*B*C*D* EA*B*C*D*E2F+2A*B*C*DA*B*CA*BA, B, C, D, E, F Hence, the generation of a vector tile of a selected squared map area may be divided into a plurality of tasks. The tasks may be solved collectively by the two or more processing units 110 of the distributed computing system 100, as described herein. In particular, the task-DAG 400 may include a number of A tasks for obtaining map data at the first zoom level Z1, a number of tasks for obtaining map data at the second zoom level Z2, a number of tasks for obtaining map data at the third zoom level Z3, a number of tasks for obtaining map data at the fourth zoom level Z4, a number of tasks for rendering the obtained map data at the fourth zoom level Z4, a number of tasks for obtaining map data at the fifth zoom level Z5, and for each of the tasks one task, if the data size of the map data at the fifth zoom level Z5 is not greater than the threshold value, and tasks, if the data size of the map data at the fifth zoom level Z5 is greater than the threshold value, a number of tasks of merging the vector tiles at the fourth zoom level Z4, a number of tasks of merging the vector tiles at the third zoom level Z3, a number of tasks of merging the vector tiles at the second zoom level Z2, a number of A tasks of merging the vector tiles at the first zoom level Z1, a task of merging the vector tile Z0-Z3 from the non-zoomed to the third zoom levels, and a task of merging the vector tile Z0-Z3 and the number of A vector tiles at the first zoom level Z1. As an example, each predefined value may be equal to four and the task-DAG 400 may include between 2986 individual tasks (1962+1024 tasks in the case that a data size at the fifth zoom level Z5 is not greater than the threshold for each squared map area) and 12202 individual tasks (1962+10240 tasks in the case that a data size at the fifth zoom level Z5 is greater than the threshold for each squared map area).

A*BA*B*CA*B*C*DA*B*C*DA*B*C*D*EA* B*C*D*E2F+2A*B*C*DA*B*CA*BA,B,C,D,E,F

According to various aspects, the selected squared map area may be the world map. According to an example, the selected squared map area may be a map of a continent or a map of Southeast Asia. The map of the continent or Southeast Asia may be, for example, represented by a vector tile at the second zoom level (or third zoom level) and the distributed computing system 100 may be configured to generate the vector tile at the second zoom level (or third zoom level) such that the scheduling processing unit determines the tasks dependent on the vector tile and provides the tasks consecutively to the task database 106. According to various aspects, distributed computing system 100 using the task-DAG 400 may be capable to generate a vector tile of the world map, a vector tile of the map of a continent, and/or the map of Southeast Asia in less than one week. For example, the distributed computing system 100 using the task-DAG 400 may be capable to generate a vector tile of the world map in less than 5 days. For example, the distributed computing system 100 using the task-DAG 400 may be capable to generate a vector tile of a map of a selected continent or a map of Southeast Asia in less than 5 hours. Hence, distributed computing system 100 using the task-DAG 400 is capable to significantly reduce the computation cost and the time cost for the generation of a (e.g., large-scale) vector tile. For example, using the distributed computing system 100 employing the task-DAG 400 may reduce the time cost by more than 90%.

According to various aspects, other map data may be provided (e.g., stored in the memory unit 102). The other map data may include one or more other squared map areas. Each other squared map area of the one or more other squared map areas may cover at least the selected squared map area. Each other squared map area of the one or more other squared map area may include respective features different from the features shown in the selected squared map area. For example, the features of shown in at least some zoom levels of the selected squared map area may include land area (e.g., continents, e.g., islands), oceans, landforms (e.g., hills, valleys, gullies, ridges, etc.), water courses (e.g., rivers, swamps, coastal, etc.), vegetation (e.g., national parks, farmland, plantations, etc.), and/or manmade objects/stipulations (e.g., buildings, roads, property boundaries, political boundaries, points of interest, etc.); and the features shown in at least one other squared map area of the one or more other squared map areas may represent a traffic volume and/or information on points of interest (e.g., sights, restaurants, gas stations, public transport stops, museums, etc.). The other map data may represent each other squared map area at the non-zoomed level Z0 and at the plurality of zoom levels Z1 to Zn. In the case of the one or more other map data, the task-DAG 400 may, for each of the one or more other squared map areas, include a task of generating cut map data by cutting the respective squared map area such that the cut map area covers the same area as the selected squared map area. The task-DAG 400 may, for each cut map area, include all tasks of obtaining map data associated with map subareas and all tasks of rendering map data as described above with reference to the selected squared map area represented by the map data 104. In the case of the one or more other map data, the task-DAG 400 may, for each squared map subarea associated with the fifth zoom level Z5, include a task of merging the respectively generated vector tile associated with the fifth to n-th zoom levels of the selected squared map area and the respectively generated one or more other vector tiles associated with the fifth to n-th zoom levels of the one or more other squared map areas to a combined vector tile associated with the fifth to n-th zoom levels. The respective task of merging the vector tile associated with the fourth zoom level and the vector tiles associated with the fifth to n-th zoom levels to generate a respective vector tile associated with the fourth to n-th zoom levels may include a task of merging the vector tile associated with the fourth zoom level of the selected squared map area, the one or more other vector tiles associated with the fourth zoom level of the one or more other squared map areas, the vector tiles associated with the fifth to n-th zoom levels of the selected squared map area, and the vector tiles associated with the fifth to n-th zoom levels of the one or more other squared map areas to generate a combined vector tile associated with the fourth to n-th zoom levels. The task of merging the vector tile Z0-Z3 and all vector tiles at the first zoom level Z1 may include a task of merging the vector tile Z0-Z3 of the selected squared map area, the one or more other vector tiles Z0-Z3 of the one or more other squared map area, and all vector tiles at the first zoom level Z1 to generated a combined vector tile associated with each of the non-zoomed level Z0 to n-th zoom level Zn.

Figure 6:
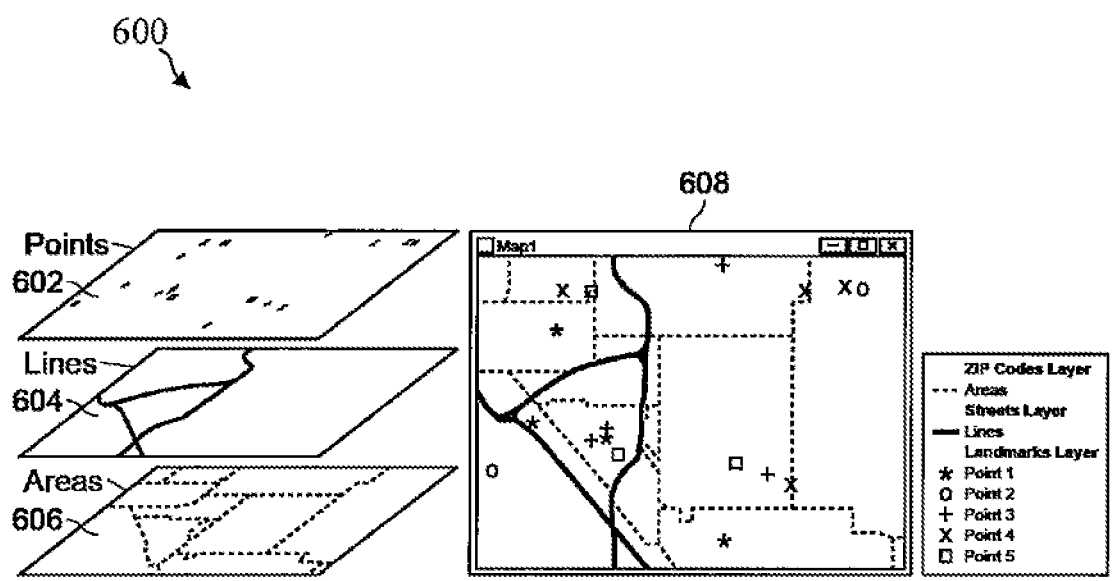
FIG. 6 shows an exemplary GIS layer structure according to various embodiments.

Illustratively, different map data may be processed in accordance with the task-DAG 400 and generated vector tiles may be combined vector tiles including the features of all map data. A vector tile may be represented by a layer structure including a plurality of layers. Each layer may show features different from the other layers. A layer may be a Geographic Information System (GIS) database. An exemplary GIS layer structure 600 is shown in FIG. 6 including a point layer of landmarks 602, a line layer of streets 604, and an area layer of ZIP codes 606. A vector tile including the layers 602, 604, 606 may represent the map 608. The combined vector tiles may represent layers associated with different map data and/or different map areas. For example, a combined vector tile may include a line layer of streets generated from first map data, a line layer of a traffic volume generated from second map data, and a point layer of points of interest generated from third map data. In this case, the respective features may be shown in the respective map data of the first map data, the second map data, and the third map data and not shown in the other map data.

Illustratively, at various zoom levels, specified by a respective resolution and a respective detail level, a squared map area may be divided into a predefined number (e.g., four) of squared map subareas and the task-DAG 400 may, for each of the squared map subareas, include a task of obtaining map data (e.g., cutting the squared map area) representing the respective squared map subarea at the next zoom level; another task may refer to generating a preliminary vector tile by rendering the map data representing the squared map area at the zoom level; for each of the squared map subareas, a respective task may refer to generating a vector sub-tile by rendering the respectively obtained map data at the next zoom level; and a further task may refer to generating a vector tile by merging the preliminary vector tile and the vector sub-tiles. In various embodiments, other map data including one or more other squared map areas may be provided, as described above, and a corresponding preliminary vector tile may be generated for each of the one or more other squared map areas. Further, a vector sub-tiles may be generated for each squared map subareas of each of the one or more other squared map areas. According to various aspects, a combined preliminary vector tile may be generated by merging all preliminary vector tiles and, for each squared map subareas, a combined vector sub-tile may be generated by merging the vector sub-tiles associated with the squared map subareas of the selected squared map area and of each of the one or more other squared map areas. According to various aspects, a combined vector tile may be generated by merging the combined preliminary vector tile and all vector sub-tiles.

According to various aspects, the distributed computing system 100 using the task-DAG 400 may be capable to improve a flexibility and reliability of generating vector tiles. For example, multiple data sources may be combined as described above. Further, a real-time monitoring, a tracking of historical (previous) versions of vector tiles, and/or a collection of log data may be employed.

FIG. 7 shows a flow diagram 700 illustrating a method for generating a vector tile of a selected squared map area according to an embodiment. The method may be performed using a distributed computing system, such as the distributed computing system 100.

The method may include selecting a processing unit of a plurality of processing units (in 702). The distributed computing system may include the plurality of processing units.

The method may include that the selected processing unit schedules the generation of the vector tile of the selected squared map area by determining tasks using a directed acyclic task graph (in some aspects referred to as task-DAG) and providing the determined tasks to a task database (in 704). The directed acyclic task graph may include: a task of providing map data including coordinates corresponding to the selected squared map area, a representation of the selected squared map area with a first resolution and a first detail level, and a representation of the selected squared map area with a second resolution higher than the first resolution and a second detail level, the second detail level including a higher number of details than the first detail level; the selected processing unit determining respective coordinates of each of a predefined number of squared map subareas by dividing the selected squared map area into the predefined number of squared map subareas, and for each of the squared map subareas, a task of obtaining map data representing the respective squared map subarea with the second resolution and the second detail level using the determined coordinates of the respective squared map subarea; a task of generating a preliminary vector tile by rendering the map data representing the selected squared map area with the first resolution and the first detail level; for each of the squared map subareas, a task of generating a vector sub-tile by rendering the respectively obtained map data; and a task of generating the vector tile of the selected squared map area by merging the preliminary vector tile and the vector sub-tiles.

The method may include that each processing unit of the plurality of processing units repeatedly: selects a task included in the task database, executes the selected task, and provides data (e.g., obtained map data, e.g., a generated vector tile) generated by the selected task to a memory of the distributed computing system (in 706).

While the disclosure has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A distributed computing system for generating vector tiles of a selected squared map area, the distributed computing system comprising:
   a memory unit configured to store map data, a task database, and generated vector tiles, wherein the map data comprise coordinates corresponding to the selected squared map area, a representation of the selected squared map area with a first resolution and a first detail level, and a representation of the selected squared map area with a second resolution higher than the first resolution and a second detail level, the second detail level comprising a higher number of details than the first detail level;
   two or more processing units, each of the two or more processing units configured to select a task comprised in the task database, to execute the selected task, and to provide data generated by the selected task to the memory unit for storage;
   a monitoring unit configured to perform a heartbeat monitoring of each processing unit of the two or more processing units;
   a control unit configured to receive information regarding the heartbeat monitoring of each processing unit from the monitoring unit, and select one processing unit from the two or more processing units as a scheduling processing unit to schedule the generation of the vector tiles of the selected squared map area;
   wherein a first processing unit of the two or more processing units is initially selected as the scheduling processing unit, and if the heartbeat monitoring indicates a connectivity loss of the first processing unit, the control unit is configured to select another processing unit of the two or more processing units as the scheduling processing unit to schedule the generation of the vector tiles of the selected squared map area;
   wherein the scheduling processing unit is configured to determine the tasks dependent on the vector tiles and provide the tasks consecutively to the task database, and wherein the directed acyclic task graph comprises:
   a task of determining respective coordinates of each of a predefined number of squared map subareas by dividing the selected squared map area into the predefined number of squared map subareas, and for each of the squared map subareas;
   a task of obtaining map data representing the respective squared map subarea with the second resolution and the second detail level using the determined coordinates of the respective squared map subarea;
   a task of generating a preliminary vector tile by rendering the map data representing the selected squared map area with the first resolution and the first detail level;
   for each of the squared map subareas, a task of generating a vector sub-tile by rendering the respectively obtained map data; and
   a task of generating a vector tile of the selected squared map area by merging the preliminary vector tile and the vector sub-tiles.

2. The distributed computing system according to claim 1, wherein the memory unit is further configured to store other map data, wherein the other map data comprise respective coordinates corresponding to each of one or more other squared map areas, a representation of each of the one or more other squared map areas associated with the first resolution of the selected squared map area, and a representation of each of the one or more other squared map areas associated with the second resolution of the selected squared map area, wherein each of the one or more other squared map areas covers at least the selected squared map area and comprises respective features different from features shown in the selected squared map area;
   wherein the directed acyclic task graph further comprises:
   for each of the one or more other squared map areas associated with the first resolution, a task of generating cut map data by cutting the respective other squared map area such that the cut map area covers the same area as the selected squared map area;
   for each of the one or more cut map areas, the one of the two or more processing units determining respective coordinates of each of a predefined number other squared map subareas by dividing the respective cut map area into the predefined number of other squared map subareas, and for each of the other squared map subareas, a task of obtaining map data representing the respective other squared map subarea associated with the second resolution using the determined coordinates of the respective other squared map subarea, wherein each of the other squared map subareas is associated with a squared map subarea corresponding to the selected squared map area;
   for each of the one or more cut map areas, a task of generating another preliminary vector tile by rendering the cut map data representing the respective other squared map area;
   a task of generating a combined preliminary vector tile by merging the preliminary vector tile and the other preliminary vector tiles;
   for each of the one or more cut map areas, for each of the other squared map subareas, a task of generating another vector sub-tile by rendering the respectively obtained map data;
   for each squared map subarea corresponding to the selected squared map area, a task of generating a combined vector sub-tile by merging the respective vector sub-tile and the associated other vector sub-tiles; and
   wherein the task of generating the vector tile of the selected squared map area by merging the preliminary vector tile and the vector sub-tiles comprises generating the vector tile of the selected squared map by merging the combined preliminary vector tile and the combined vector sub-tiles.

3. The distributed computing system according to claim 2, wherein the features shown in the selected squared map area represent topographic features, the topographic features comprising one or more of a group consisting of: continents, hills, valleys, gullies, ridges, oceans, rivers, swamps, coastal, national parks, farmland, plantations, buildings, roads, property boundaries, political boundaries; and
   wherein the features shown in at least one other squared map area of the one or more other squared map areas represent a traffic volume and/or information on points of interest.

4. The distributed computing system according to claim 1,
wherein the memory unit is further configured to store a
log database;
wherein each of the two or more processing units is
further configured to provide log data associated with
the execution of the selected task to the log database,
the log data indicating whether a task was finished or
not; and
wherein the one of the two or more processing units is
configured to determine the tasks using the log data
stored in the log database: wherein, if the log database
comprises a task indicated as finished, the one of the
two or more processing units is configured to determine
one or more tasks directly dependent on the finished
task using the directed acyclic task graph, to determine
for each of the one or more tasks, if each task the
respective task depends on is finished and, if each task
the respective task depends on is finished, to provide
the respective task to the task database.

5. The distributed computing system according to claim 1,
further comprising:
the monitoring unit configured to perform the heartbeat
monitoring of the connectivity status of each of the two
or more processing units; and
the control unit configured to:
select the scheduling processing unit from the two or
more processing units, wherein each of the two or
more processing units is configured to schedule the
generation of vector tiles of the selected squared map
area, wherein only the selected scheduling processing unit is permitted to schedule the generation of
vector tiles, and wherein the one of the two processing units is the currently selected scheduling processing unit;
receive information regarding the heartbeat monitoring
from the monitoring unit;
and if the heartbeat monitoring indicates a connectivity
loss of the current scheduling processing unit, select
another processing unit of the two or more processing units as the scheduling processing unit to permit
the other processing unit to schedule the generation
of vector tiles of the selected squared map area.

6. The distributed computing system according to claim 1,
further comprising:
a plurality of server computers constituting a content
delivery network configured to provide the generated
vector tile.

7. The distributed computing system according to claim 6,
wherein the content delivery network is configured to
provide the generated vector tile via a Web Map Tile
Service.

8. The distributed computing system according to claim 1,
wherein each predefined number is equal to four.

9. The distributed computing system according to claim 1,
wherein the map data represent the selected squared map
area at a non-zoomed level and at a plurality of zoom
levels, the plurality of zoom levels comprising consecutively numbered zoom levels from a first zoom
level to an n-th zoom level with n≥6, wherein each
zoom level is associated with a higher resolution and a
higher number of details than the prior zoom level; and
wherein the directed acyclic task graph comprises:
dividing the selected squared map area at the non-zoomed
level into a predefined number of squared map subareas
associated with the first zoom level and for each of the
squared map subareas associated with the first zoom
level, a task of obtaining map data representing the
respective squared map subarea at the first zoom level;
for each of the squared map subareas at the first zoom
level, a task of dividing the respective squared map
subarea into a predefined number of squared map
subareas associated with the second zoom level and for
each of the squared map subareas associated with the
second zoom level, a task of obtaining map data
representing the respective squared map subarea at the
second zoom level;
for each of the squared map subareas at the second zoom
level, a task of dividing the respective squared map
subarea into a predefined number of squared map
subareas associated with the third zoom level and for
each of the squared map subareas associated with the
third zoom level, a task of obtaining map data representing the respective squared map subarea at the third
zoom level;
a task of rendering the map data from the non-zoomed
level to the third zoom level to generate a vector tile
associated with the non-zoomed to third zoom levels;
for each of the squared map subareas at the third zoom
level, a task of dividing the respective squared map
subarea into a predefined number of squared map
subareas associated with the fourth zoom level and for
each of the squared map subareas associated with the
fourth zoom level, a task of obtaining map data representing the respective squared map subarea at the
fourth zoom level;
for each of the squared map subareas at the fourth zoom
level, a task of rendering the respectively obtained map
data to generate a respective vector tile associated with
the fourth zoom level;
for each of the squared map subareas at the fourth zoom
level, a task of dividing the respective squared map
subarea into a predefined number of squared map
subareas associated with the fifth zoom level and for
each of the squared map subareas associated with the
fifth zoom level, a task of obtaining map data representing the respective squared map subarea at the fifth
zoom level;
for each of the squared map subareas at the fifth zoom
level, determining, if a data size of the respective map
data associated with the fifth zoom level is greater than
a threshold value: if the data size of the map data is not
greater than the threshold value, a task of rendering the
obtained map data from the fifth zoom level to the n-th
zoom level to a respective vector tile associated with
the fifth to n-th zoom levels; and if the data size of the
map data is greater than the threshold value, a task of
rendering the respectively obtained map data to generate a respective vector tile associated with the fifth
zoom level, a task of dividing the respective squared
map subarea at the fifth zoom level into a predefined
number of squared map subareas associated with the
sixth zoom level and for each of the squared map
subareas associated with the sixth zoom level, a task of
obtaining map data representing the respective squared
map subarea at the sixth zoom level, a task of rendering
the obtained map data from the sixth zoom level to the
n-th zoom level to a respective vector tile associated
with the sixth to n-th zoom levels, and a task of merging
the vector tile associated with the fifth zoom level and
the vector tiles associated with the sixth to n-th zoom
levels to generate a respective vector tile associated
with the fifth to n-th zoom levels;

for each of the squared map subareas at the fourth zoom level, a task of merging the respectively generated vector tile and the vector tiles associated with the fifth to n-th zoom levels corresponding to the squared map subareas at the fifth zoom level which are part of the respective squared map subarea at the fourth zoom level to generate a respective vector tile associated with the fourth to n-th zoom levels;

for each of the squared map subareas at the third zoom level, a task of merging the vector tiles associated with the fourth to n-th zoom levels corresponding to the squared map subareas at the fourth zoom level which are part of the respective squared map subarea at the third zoom level to generate a respective vector tile associated with the third to n-th zoom levels;

for each of the squared map subareas at the second zoom level, a task of merging the vector tiles associated with the third to n-th zoom levels corresponding to the squared map subareas at the third zoom level which are part of the respective squared map subarea at the second zoom level to generate a respective vector tile associated with the second to n-th zoom levels;

for each of the squared map subareas at the first zoom level, a task of merging the vector tiles associated with the second to n-th zoom levels corresponding to the squared map subareas at the second zoom level which are part of the respective squared map subarea at the first zoom level to generate a respective vector tile associated with the first to n-th zoom levels;

a task of merging the vector tile associated with the non-zoomed to third zoom levels and all vector tiles associated with the first to n-th zoom levels to generate a vector tile of the selected squared map area associated with the non-zoomed to n-th zoom levels.

10. The distributed computing system according to claim 9, wherein the selected squared map area is at least one of:
(i) a world map and wherein the generated vector tile of the selected squared map area is a vector tile of the world map;
(ii) a map of a continent and wherein the generated vector tile of the selected squared map area is a vector tile of the map of the continent; and
(iii) a map of one or more countries and wherein the generated vector tile of the selected squared map area is a vector tile of the map of the one or more countries.

11. The distributed computing system according to claim 10, wherein the distributed computing system is configured to generate the vector tile of the selected squared map area in an amount of time less than one week.

12. A method for generating vector tiles of a selected squared map area using a distributed computing system, the method comprising:
selecting a processing unit of a plurality of processing units comprised in the distributed computing system;
the selected processing unit scheduling the generation of vector tiles of the selected squared map area by determining tasks using a directed acyclic task graph and providing the determined tasks to a task database, wherein the selected processing unit is configured to determine the tasks dependent on the vector tiles and provide the tasks consecutively to the task database;
each of the plurality of processing units repeatedly: selecting a task comprised in the task database, executing the selected task, and providing data generated by the selected task to a memory of the distributed computing system;

a monitoring unit configured to perform a heartbeat monitoring of each processing unit of the two or more processing units;

a control unit configured to receive information regarding the heartbeat monitoring of each processing unit from the monitoring unit, and select one processing unit from the two or more processing units as a scheduling processing unit to schedule the generation of the vector tiles of the selected squared map area;

wherein a first processing unit of the two or more processing units is initially selected as the scheduling processing unit, and if the heartbeat monitoring indicates a connectivity loss of the first processing unit, the control unit is configured to select another processing unit of the two or more processing units as the scheduling processing unit to schedule the generation of the vector tiles of the selected squared map area;

wherein the directed acyclic task graph comprises:
a task of providing map data comprising coordinates corresponding to the selected squared map area, a representation of the selected squared map area with a first resolution and a first detail level, and a representation of the selected squared map area with a second resolution higher than the first resolution and a second detail level, the second detail level comprising a higher number of details than the first detail level;

the selected processing unit determining respective coordinates of each of a predefined number of squared map subareas by dividing the selected squared map area into the predefined number of squared map subareas, and for each of the squared map subareas;

a task of obtaining map data representing the respective squared map subarea with the second resolution and the second detail level using the determined coordinates of the respective squared map subarea;

a task of generating a preliminary vector tile by rendering the map data representing the selected squared map area with the first resolution and the first detail level;

for each of the squared map subareas, a task of generating a vector sub-tile by rendering the respectively obtained map data; and a task of generating a vector tile of the selected squared map area by merging the preliminary vector tile and the vector sub-tiles.

13. A non-transitory computer-readable medium comprising program instructions, which, when executed by processing units in a distributed computing system, cause the processing units to perform a method for generating vector tiles of a selected squared map area using the distributed computing system, the method comprising:
selecting a processing unit of a plurality of processing units comprised in the distributed computing system;
the selected processing unit scheduling the generation of vector tiles of the selected squared map area by determining tasks using a directed acyclic task graph and providing the determined tasks to a task database, wherein the selected processing unit is configured to determine the tasks dependent on the vector tiles and provide the tasks consecutively to the task database;
each of the plurality of processing units repeatedly: selecting a task comprised in the task database, executing the selected task, and providing data generated by the selected task to a memory of the distributed computing system;
a monitoring unit configured to perform a heartbeat monitoring of each processing unit of the two or more processing units;

a control unit configured to receive information regarding the heartbeat monitoring of each processing unit from the monitoring unit, and select one processing unit from the two or more processing units as a scheduling processing unit to schedule the generation of the vector tiles of the selected squared map area;

wherein a first processing unit of the two or more processing units is initially selected as the scheduling processing unit, and if the heartbeat monitoring indicates a connectivity loss of the first processing unit, the control unit is configured to select another processing unit of the two or more processing units as the scheduling processing unit to schedule the generation of the vector tiles of the selected squared map area;

wherein the directed acyclic task graph comprises:

a task of providing map data comprising coordinates corresponding to the selected squared map area, a representation of the selected squared map area with a first resolution and a first detail level, and a representation of the selected squared map area with a second resolution higher than the first resolution and a second detail level, the second detail level comprising a higher number of details than the first detail level;

the selected processing unit determining respective coordinates of each of a predefined number of squared map subareas by dividing the selected squared map area into the predefined number of squared map subareas, and for each of the squared map subareas;

a task of obtaining map data representing the respective squared map subarea with the second resolution and the second detail level using the determined coordinates of the respective squared map subarea;

a task of generating a preliminary vector tile by rendering the map data representing the selected squared map area with the first resolution and the first detail level;

for each of the squared map subareas, a task of generating a vector sub-tile by rendering the respectively obtained map data; and a task of generating a vector tile of the selected squared map area by merging the preliminary vector tile and the vector sub-tiles.

\* \* \* \* \*